(12) United States Patent
Sakimura et al.

(10) Patent No.: US 10,740,435 B2
(45) Date of Patent: Aug. 11, 2020

(54) PROGRAMMABLE LOGIC INTEGRATED CIRCUIT, DESIGN SUPPORT SYSTEM, AND CONFIGURATION METHOD

(71) Applicant: NEC Corporation, Minato-ku, Tokyo (JP)

(72) Inventors: Noboru Sakimura, Tokyo (JP); Yukihide Tsuji, Tokyo (JP); Ayuka Tada, Tokyo (JP); Xu Bai, Tokyo (JP); Makoto Miyamura, Tokyo (JP); Ryusuke Nebashi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 126 days.

(21) Appl. No.: 15/576,947

(22) PCT Filed: May 23, 2016

(86) PCT No.: PCT/JP2016/002495
§ 371 (c)(1),
(2) Date: Nov. 27, 2017

(87) PCT Pub. No.: WO2016/194332
PCT Pub. Date: Dec. 8, 2016

(65) Prior Publication Data
US 2018/0157779 A1    Jun. 7, 2018

(30) Foreign Application Priority Data
May 29, 2015   (JP) ................. 2015-109908

(51) Int. Cl.
*G06F 17/50*       (2006.01)
*H03K 19/17732*    (2020.01)
(Continued)

(52) U.S. Cl.
CPC ........ *G06F 17/5054* (2013.01); *G06F 17/505* (2013.01); *G06F 17/5072* (2013.01);
(Continued)

(58) Field of Classification Search
CPC ............ G06F 17/5054; G06F 17/5077; G06F 17/5072; G06F 17/505; G06F 2217/72;
(Continued)

(56) References Cited

U.S. PATENT DOCUMENTS 4,786,904 A * 11/1988 Graham, III ....... H03K 19/1736
                                                  326/38
4,899,067 A    2/1990 So et al.
(Continued)

FOREIGN PATENT DOCUMENTS

JP    06-45451 A      2/1994
JP    2006-134997 A   5/2006
(Continued)

OTHER PUBLICATIONS

M. Miyamura, et al., "Low-power Programmable-logic Cell Arrays using Nonvolatile Complementary Atom Switch", 15th International Symposium (ISQED), pp. 330-334, 2014.
(Continued)

*Primary Examiner* — Nha T Nguyen

(57) ABSTRACT

Provided is a programmable logic integrated circuit wherein even if a failure occurs in any resistance-variable element, remedy would be possible and hence the improvement of reliability has been achieved. In a programmable logic integrated circuit comprising resistance-variable elements, when the states of the resistance-variable elements are to be changed according to externally inputted configuration information, a control means uses a reading means to read the states of the respective resistance-variable elements, and then uses a writing means to change only the states of resistance-changing elements that are different from a state indicated by the configuration information.

8 Claims, 31 Drawing Sheets

(51) Int. Cl.
*H03K 19/173* (2006.01)
*G11C 29/00* (2006.01)
*G11C 13/00* (2006.01)
*G11C 7/22* (2006.01)
*H03K 19/003* (2006.01)

(52) U.S. Cl.
CPC ............ *G06F 17/5077* (2013.01); *G11C 7/22* (2013.01); *G11C 13/004* (2013.01); *G11C 29/00* (2013.01); *G11C 29/76* (2013.01); *H03K 19/003* (2013.01); *H03K 19/1736* (2013.01); *H03K 19/17732* (2013.01); *G06F 2217/06* (2013.01); *G06F 2217/72* (2013.01); *G06F 2217/78* (2013.01); *G11C 2213/77* (2013.01); *G11C 2213/79* (2013.01)

(58) Field of Classification Search
CPC ............. G06F 2217/78; G06F 2217/06; G11C 13/004; G11C 29/00; G11C 29/76; G11C 7/22; G11C 2213/79; G11C 2213/77; H03K 19/1736; H03K 19/17732; H03K 19/003
See application file for complete search history.

(56) References Cited

U.S. PATENT DOCUMENTS

| | | | |
|---|---|---|---|
| 5,498,975 A | 3/1996 | Cliff et al. | |
| 6,065,141 A | 5/2000 | Kitagawa | |
| 9,042,153 B2* | 5/2015 | Chung | G11C 11/56 365/148 |
| 9,070,437 B2* | 6/2015 | Chung | G11C 13/0002 |
| 9,166,598 B1 | 10/2015 | Lewis | |
| 9,312,002 B2* | 4/2016 | Navon | G11C 13/0069 |
| 9,350,356 B2* | 5/2016 | Tatsumura | G11C 8/10 |
| 9,786,365 B2* | 10/2017 | Zaitsu | H03K 19/1736 |
| 2006/0091899 A1 | 5/2006 | Akimichi | |
| 2010/0108479 A1 | 5/2010 | Ebeling et al. | |
| 2010/0177555 A1* | 7/2010 | Shimakawa | G11C 13/0007 365/148 |
| 2011/0063902 A1* | 3/2011 | Lung | G11C 7/067 365/163 |
| 2011/0128773 A1* | 6/2011 | Azuma | G11C 13/0007 365/148 |
| 2011/0238902 A1 | 9/2011 | Ishikawa et al. | |
| 2012/0026779 A1* | 2/2012 | Ikegami | G11C 13/0002 365/148 |
| 2012/0326113 A1* | 12/2012 | Yoneda | G11C 13/0007 257/4 |
| 2013/0010522 A1* | 1/2013 | Kanzawa | G11C 13/0007 365/148 |
| 2015/0356006 A1* | 12/2015 | Perner | G11C 13/0002 711/103 |
| 2016/0189774 A1* | 6/2016 | Xie | G11C 13/0004 365/163 |
| 2016/0203866 A1* | 7/2016 | Zaitsu | G11C 13/0002 365/63 |
| 2016/0276025 A1* | 9/2016 | Tatsumura | G11C 13/0028 |
| 2016/0284403 A1* | 9/2016 | Navon | G06F 11/1068 |

FOREIGN PATENT DOCUMENTS

| | | |
|---|---|---|
| JP | 4356542 B2 | 11/2009 |
| JP | 2013-236082 A | 11/2013 |
| JP | 2014-093782 A | 5/2014 |
| WO | 2010/061760 A1 | 6/2010 |
| WO | 2012/043502 A1 | 4/2012 |

OTHER PUBLICATIONS

Japanese Office Action for JP Application No. 2017-521680 dated Jun. 16, 2020 with English Translation.

* cited by examiner (a)

(b)

(a)

(b)

PROGRAMMABLE LOGIC INTEGRATED CIRCUIT, DESIGN SUPPORT SYSTEM, AND CONFIGURATION METHOD

This application is a National Stage Entry of PCT/JP2016/002495 filed on May 23, 2016, which claims priority from Japanese Patent Application 2015-109908 filed on May 29, 2015, the contents of all of which are incorporated herein by reference, in their entirety.

TECHNICAL FIELD

The present invention relates to a programmable logic integrated circuit including a variable resistance element, a design support system thereof and a configuration method thereof.

BACKGROUND ART

In general, a semiconductor integrated circuit includes a large number of transistors formed on a semiconductor substrate, and a wiring layer formed on an upper layer of the semiconductor substrate and connecting each transistor. Usually, a wiring pattern for connecting each transistor is determined at a design stage of a semiconductor integrated circuit, and it is impossible to change the connection between the transistors after manufacturing the semiconductor integrated circuit.

On the other hand, a programmable logic integrated circuit such as an FPGA (Field Programmable Gate Array) has a configuration in which connection of a plurality of logical operation circuits (logic blocks) provided inside can be changed even after manufacturing. Therefore, by freely combining a plurality of logic blocks, a user can form (implement) a desired logic circuit in a programmable logic integrated circuit. Information (configuration information) necessary for forming a desired logic circuit is stored in a memory element of the programmable logic integrated circuit. An SRAM (Static Random Access Memory) cell, an antifuse, a floating gate MOS (Metal Oxide Semiconductor) transistor, or the like is used as a memory element for storing configuration information.

Since switches for connecting these memory elements and logic blocks in a changeable manner are usually formed in the same layer as a logic block composed of a large number of transistors, they cause a large area overhead factor. Therefore, the chip area of the programmable logic integrated circuit is increased, and the manufacturing cost is increased. As the layout area of memory elements and switches increases, the ratio of logic blocks to the chip area decreases.

Therefore, a programmable logic integrated circuit using a variable resistance element that can be formed in a wiring layer has been proposed as a switch that can change connection between logic blocks after manufacturing while suppressing an increase in the layout area. For example, programmable logic integrated circuits described in Patent Literature 1 (PTL1), Patent Literature 2 (PTL2), and Non Patent Literature 1 (NPL1) have a configuration in which a variable resistance element made of a solid electrolyte material containing a metal ion is arranged between a first wiring layer and a second wiring layer formed on the first wiring layer. Resistance value of the variable resistance element can be changed by applying a bias voltage in the forward direction or the reverse direction across both ends of the variable resistance element, and the ratio of a high resistance state (OFF state) to a low resistance state (ON state) is $10^5$ or more. In other words, the variable resistance element functions as a switch for electrically connecting or disconnecting the first wiring and the second wiring.

For connection and disconnection of wiring in the programmable logic integrated circuit of the background art, a switch cell having an SRAM cell as a memory element and one transistor with a switch function is used. On the other hand, since the variable resistance element has both a memory function and a switch function, a switch cell can be realized with one variable resistance element.

According to PTL1, by arranging a variable resistance element at each intersection of a first wiring group and a second wiring group crossing the first wiring group, a crossbar switch capable of connecting or disconnecting an arbitrary wiring of the first wiring group and an arbitrary wiring of the second wiring group can be realized with a compact size. As a result, it is expected that the performance of a programmable logic integrated circuit is improved by considerably reducing the chip area and improving the use efficiency of a logic block. Since an ON/OFF state of the variable resistance element is maintained even when power supply to the programmable logic integrated circuit is discontinued, there is also an advantage that it is possible to omit the trouble of loading configuration information every time the power is turned on.

By the way, it is known that, in a semiconductor integrated circuit including a programmable logic integrated circuit, it is very effective to provide a redundant circuit in preparation for defects of transistors and wirings generated during manufacturing, in order to improve production yield. For example, Patent Literature 3 (PTL3) or Patent Literature 4 (PTL4) discloses a technique in which a redundant circuit is provided, and a circuit (defective circuit) in which a failure occurs is replaced by the redundant circuit.

When a defective circuit is detected in a screening test before shipping, it is common that the shipment is made after forming a route that bypasses the defective circuit by a redundant circuit. By this, even when a defective circuit is included in a shipped programmable logic integrated circuit, a user of the programmable logic integrated circuit can configure a desired logic circuit without being conscious of the defective circuit.

CITATION LIST

Patent Literature

[PTL1] Japanese Patent No. 4,356,542
[PTL2] WO2012/043502
[PTL3] U.S. Pat. No. 4,899,067
[PTL4] Japanese Patent Application Laid-Open No. 2014-93782

Non Patent Literature

[NPL1] M. Miyamura et al., "Low-power programmable-logic cell arrays using nonvolatile complementary atom switch", 15th International Symposium (ISQED), pp. 330-334, 2014

SUMMARY OF INVENTION

Technical Problem

In the programmable logic integrated circuit including the variable resistance element described above, there is a possibility that a new failure may occur by changing the ON/OFF state of the variable resistance element after shipment. The ON/OFF state of the variable resistance element is changed by writing configuration information to the programmable logic integrated circuit.

Typically, a failure occurs in a variable resistance element is an OFF malfunction (ON-fixed) in which an OFF state cannot be set from an ON state, and an ON malfunction (OFF-fixed) in which the ON state cannot be set from the OFF state. In one conceivable case, these failures are revealed after shipment when there is a variable resistance element with a smaller number of times that the ON/OFF state can be changed than the number of times of rewriting of configuration information guaranteed by the manufacturer of a programmable logic integrated circuit. In another conceivable case, these failures are revealed when there is a variable resistance element whose withstand voltage is lower than usual and when the variable resistance element is destroyed at the time of writing configuration information. Even when rewriting of configuration information is performed, the state of a variable resistance element which becomes defective cannot be changed in its ON/OFF state, and therefore, a user cannot realize a desired logic circuit. In such a case, a programmable logic integrated circuit including a variable resistance element which becomes defective needs to be replaced with a substitute product, which causes a cost increase of the programmable logic integrated circuit.

Therefore, a technique for remedying a programmable logic integrated circuit including a variable resistance element in which the failure has occurred, which can form a logic circuit designed by a user without problems even when a failure occurs in the variable resistance element after shipment, is desired. It is desirable that the technique improves the reliability of the programmable logic integrated circuit.

The present invention has been made to solve the problems of the background art as described above, and an object thereof is to provide a programmable logic integrated circuit that can be remedied even when a failure occurs in a variable resistance element and can improve reliability.

Solution to Problem

To achieve the above-mentioned object, a programmable logic circuit according to the present invention, includes:

a plurality of logic blocks;

a plurality of crossbar switch blocks having a plurality of variable resistance elements arranged at intersections of a plurality of first wirings extending in a first direction and a plurality of second wirings extending in a second direction, for connecting or disconnecting between the first wirings and the second wirings;

a connection switch block for connecting or disconnecting between an input wiring for inputting a signal to the logic block and the crossbar switch block;

reading means for detecting a state of the variable resistance element;

writing means for changing a state of the variable resistance element; and control means for reading a state of each variable resistance element by the reading means and changing only a state of the variable resistance element different from a state indicated by the configuration information by the writing means when changing a state of the variable resistance element according to the configuration information inputted from the outside.

A design support system according to the present invention is a design support system for supporting a design of a circuit to be implemented on a programmable logic integrated circuit including a variable resistance element, comprises:

resource setting means for generating resource information which is information indicating a circuit element usable in the circuit based on defect information indicating the presence or absence of a failure of the programmable logic integrated circuit to which the circuit is to be implemented;

configuration information generating means for generating configuration information by performing virtual placement and routing based on a netlist which is connection information of element circuits included in the programmable logic integrated circuit and the resource information; and defect information generating means for comparing configuration information generated by the configuration information generating means with internal configuration information which is configuration information read from the programmable logic integrated circuit and updating the defect information when the configuration information generated by the configuration information generating means and the internal configuration information do not match each other.

A configuration method according to the present invention is a configuration method for forming a desired circuit in a programmable logic integrated circuit including a variable resistance element, comprises:

a first step of logically combining operation description information of the circuit described by a hardware description language and generating a netlist of the circuit;

a second step of generating resource information which is information indicating a circuit element usable in the circuit based on the netlist and defect information indicating the presence or absence of a failure in the programmable logic integrated circuit to be implemented on the circuit;

a third step of implementing virtual placement and routing based on the netlist and the resource information to generate configuration information which is information needed for forming the circuit;

a fourth step of calculating a signal delay and power consumption of the circuit indicated by the configuration information created in the third step and verifying whether or not a preset specification is satisfied;

a fifth step of writing the configuration information verified in the fourth step into the programmable logic integrated circuit;

a sixth step of acquiring internal configuration information which is configuration information written in the programmable logic integrated circuit;

a seventh step of comparing the configuration information verified in the fourth step with the internal configuration information;

an eighth step of updating the defect information based on a difference between the configuration information verified in the fourth step and the internal configuration information when the configuration information verified in the fourth step does not match the internal configuration information; and a ninth step of repeating the second to eighth steps until the configuration information verified in the fourth step and the internal configuration information match.

Advantageous Effect of Invention

According to the present invention, even when a failure occurs in a variable resistance element, a programmable logic integrated circuit can be remedied, and the reliability of the programmable logic integrated circuit can be improved.

DESCRIPTION OF EMBODIMENTS

Next, the present invention will be described with reference to the drawings.

First Example Embodiment

Figure 1:
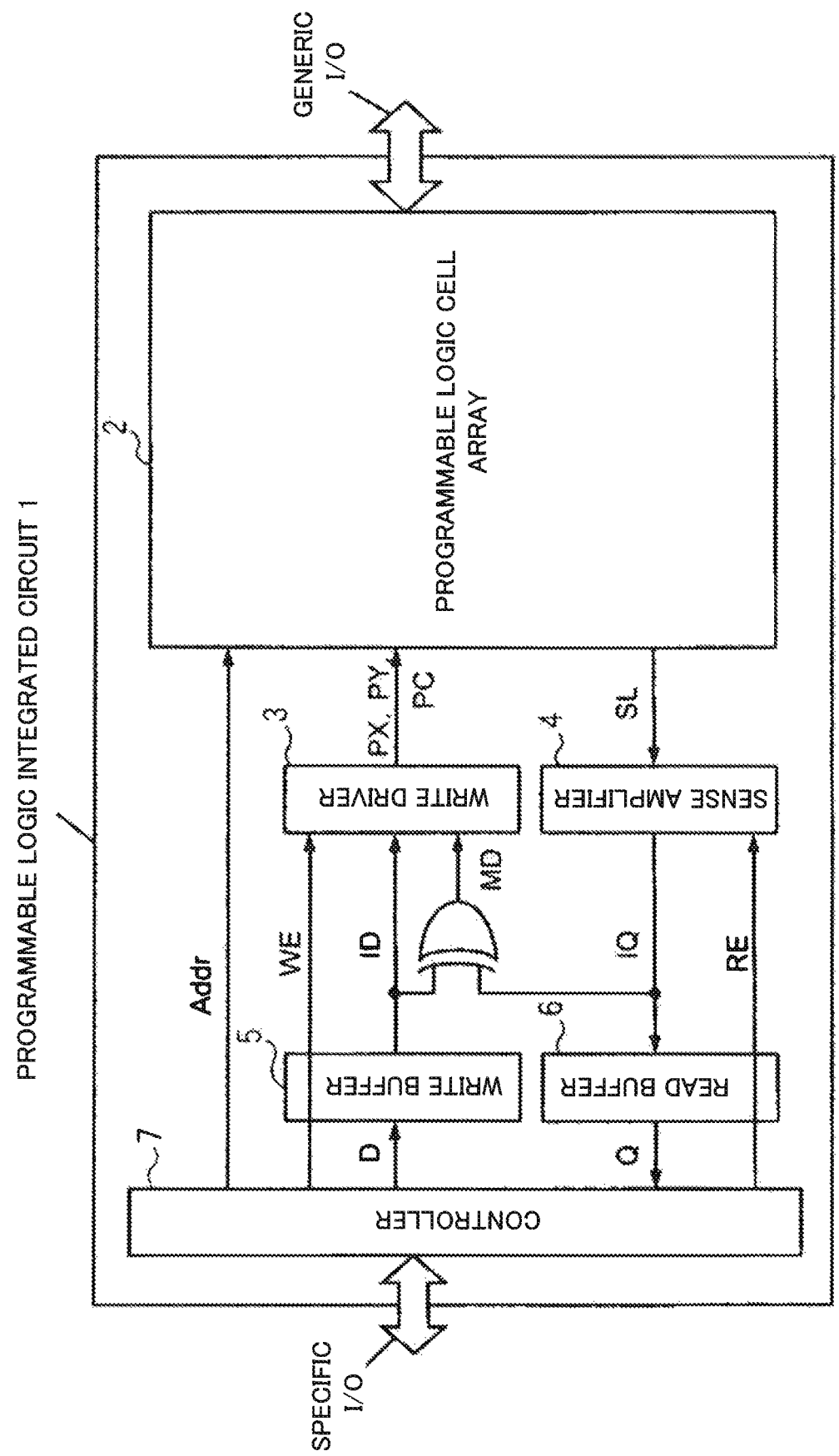
FIG. 1 is a block diagram illustrating a configuration example of a programmable logic integrated circuit of the present invention.
Figure 2:
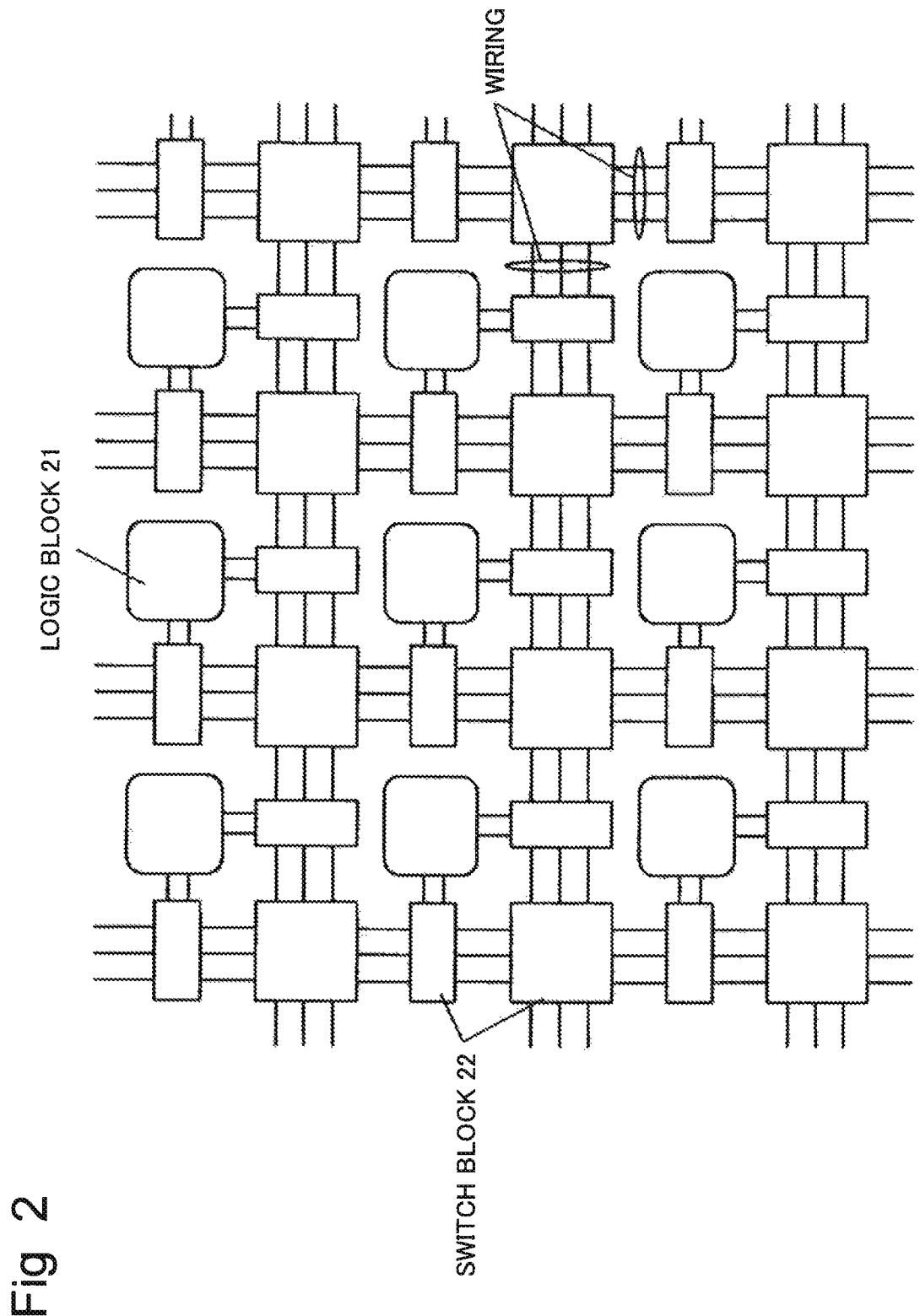
FIG. 2 is a schematic diagram illustrating a configuration example of a programmable logic cell array illustrated in FIG. 1.

FIG. 1 is a block diagram illustrating a configuration example of a programmable logic integrated circuit according to the present invention, and FIG. 2 is a schematic diagram illustrating a configuration example of a programmable logic cell array illustrated in FIG. 1.

As illustrated in FIG. 1, the programmable logic integrated circuit 1 of the present invention includes a programmable logic cell array 2, a write driver 3, a sense amplifier 4, a write buffer 5, a read buffer 6, and a controller 7.

The controller 7 includes an unillustrated external interface (I/F) circuit, stores configuration information input from a specific I/O via the external I/F circuit in the write buffer 5, activates the write driver 3, and controls writing operation of configuration information for a programmable logic cell array. The controller 7 activates the sense amplifier 4, reads configuration information (internal configuration information) written in the programmable logic cell array 2, stores the configuration information in the read buffer 6, and outputs the internal configuration information stored in the read buffer 6 via the specific I/O.

The controller 7 is an example of control means included in the programmable logic integrated circuit of the present invention, the write driver 3 and the write buffer 5 are examples of writing means included in the programmable logic integrated circuit of the present invention, and the sense amplifier 4 and the read buffer 6 are examples of reading means included in the programmable logic integrated circuit of the present invention. The reading means detects the state of a variable resistance element. The writing means changes the state of a variable resistance element.

As illustrated in FIG. 2, the programmable logic cell array 2 includes a plurality of logic blocks 21 and a plurality of switch blocks 22, and each logic block 21 is connected to each other by the switch block 22. The switch block 22 includes a connection switch block and a crossbar switch block which will be described below. In this specification, the minimum constituent unit composed of one logic block 21 and a switch block 22 for connecting the logic block 21 to another logic block 21 is referred to as a segment.

Figure 3:
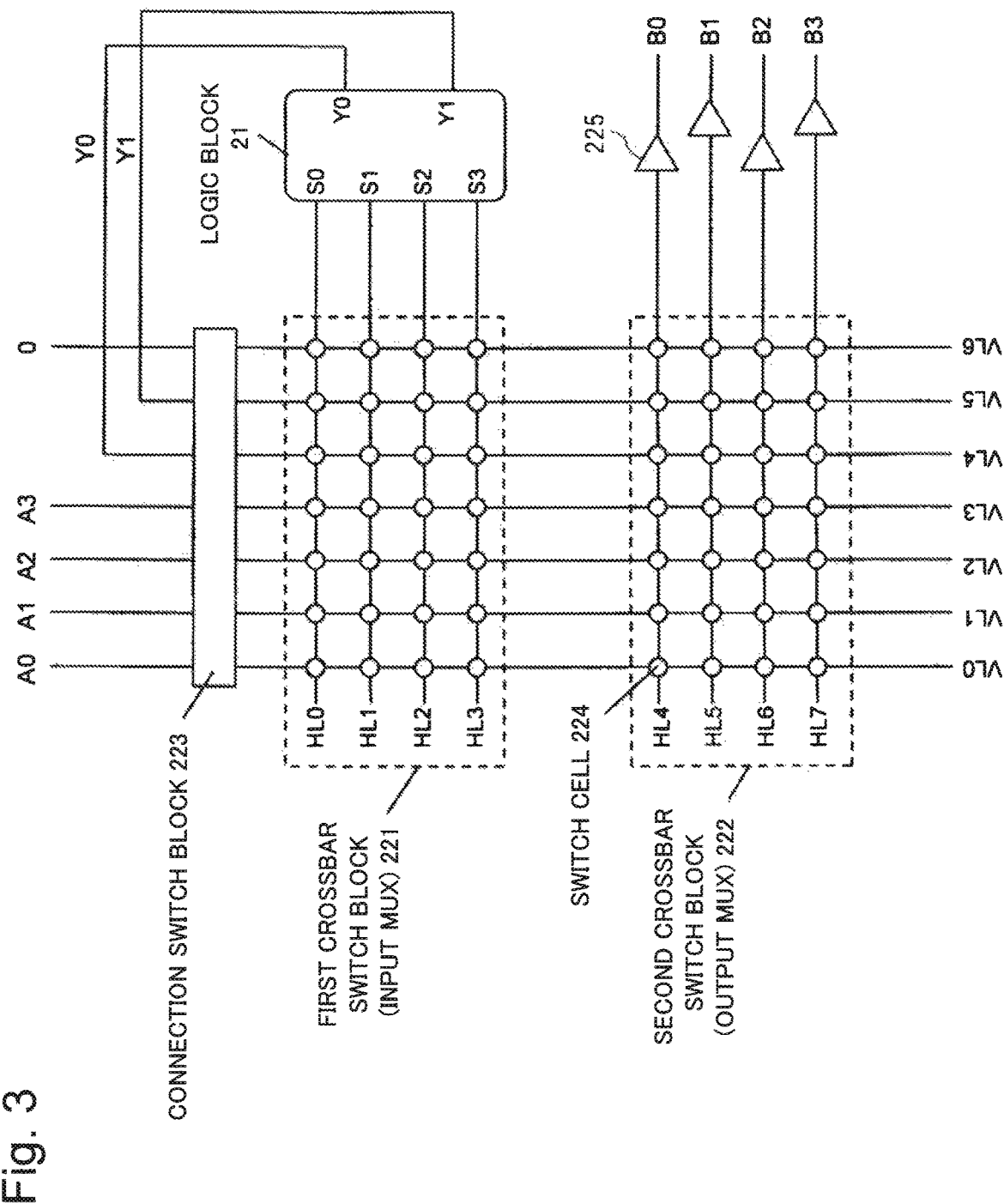
FIG. 3 is a block diagram illustrating a configuration example of a segment included in the programmable logic integrated circuit according to the first example embodiment.

FIG. 3 is a block diagram illustrating a configuration example of a segment included in the programmable logic integrated circuit according to the first example embodiment.

Wirings A0 to A3 illustrated in FIG. 3 are input wirings of a segment, and signals are supplied from an unillustrated adjacent segment located on the upper, lower, left, or right in FIG. 3 or a distant segment thereof. Wirings B0 to B3 illustrated in FIG. 3 are output wirings of the segment, and an output signal is outputted to an unillustrated adjacent segment located at the upper, lower, left, or right in FIG. 3 or a distant segment thereof via an output buffer 225.

As illustrated in FIG. 3, the segment comprises a crossbar switch block including a plurality of switch cells 224 arranged at intersections of row wirings and column wirings for connecting or disconnecting a plurality of row wirings (first wirings) HL0 to HL7 extending in a first direction and a plurality of column wirings (second wirings) VL0 to VL6 extending in a second direction different from the first direction, a connection switch block 223 for connecting or disconnecting the input wirings A0 to A3 for inputting a signal to the logic block 21 and the crossbar switch block, and a plurality of output buffers 225 for outputting signals from the output wirings B0 to B3. The crossbar switch block includes a first crossbar switch block 221 and a second crossbar switch block 222.

Wirings Y0 to Y1 are output wirings of the logic block 21, and wiring 0 is a ground line. The connection switch block 223 electrically connects or disconnects the input wirings A0 to A3, the wirings Y0 to Y1, and the ground line and the column wirings VL0 to VL6. The first crossbar switch block 221 is provided for selecting row wirings HL0 to HL3 connected to input terminals S0 to S3 of the logic block 21, and operates as an input multiplexer (MUX). The second crossbar switch block 222 is provided for selecting row wirings HL4 to HL7 connected to the input terminals of the output buffer 225, and operates as an output multiplexer (MUX). FIG. 3 illustrates a configuration example in which a segment includes four input wirings A0 to A3 and output wirings B0 to B3 for simplicity of explanation, and the number of input wirings and output wirings included in an actual segment is about several tens.

In the first crossbar switch block 221 and the second crossbar switch block 222 illustrated in FIG. 3, for example, a variable resistance element is used for the switch cell 224 arranged at each of the intersections of row wirings and a column wirings.

Figure 4:
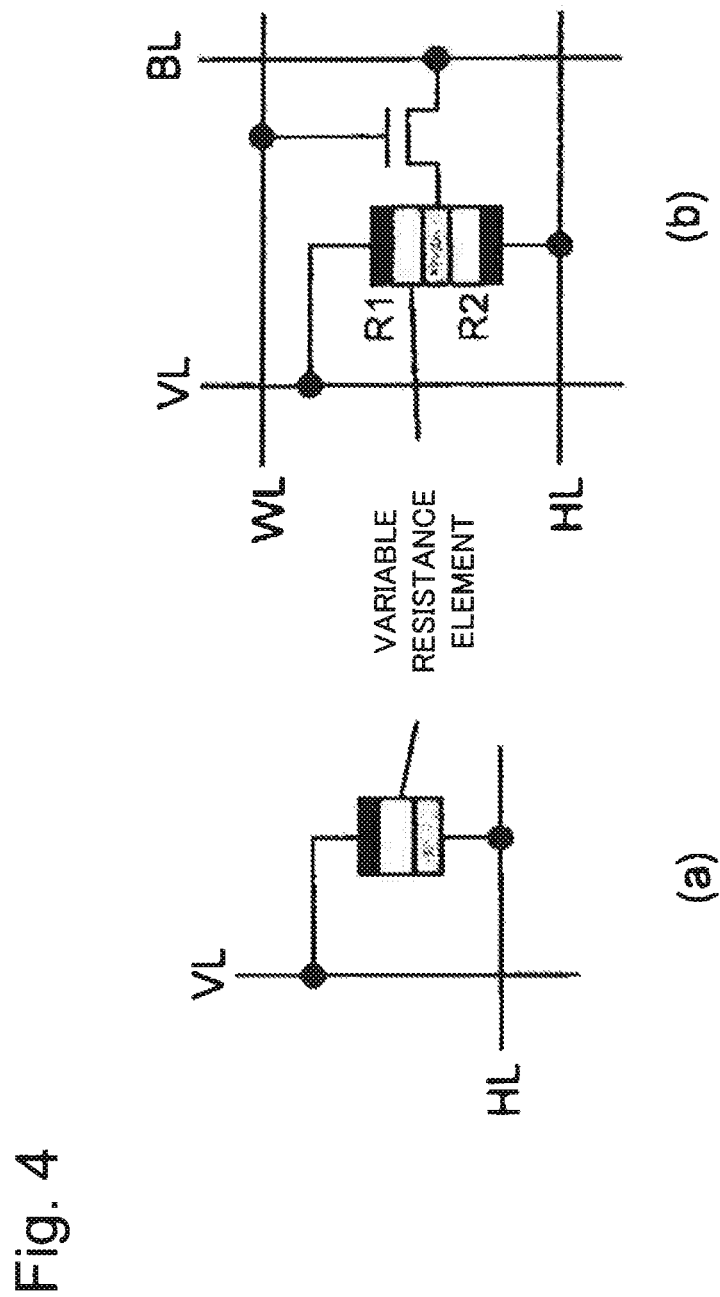
FIG. 4 is a circuit diagram illustrating a configuration example of a switch cell included in the first and second crossbar switch blocks illustrated in FIG. 3.

FIG. 4 is a circuit diagram illustrating a configuration example of a switch cell included in the first and second crossbar switch blocks illustrated in FIG. 3. FIG. 4(*a*) illustrates a configuration example of a 0T1R type switch cell 224 including the variable resistance element, FIG. 4(*b*) illustrates a configuration example of a 2T1R switch cell 224 including two variable resistance elements and one transistor.

When the row wiring HL and the column wiring VL illustrated in FIG. 3 are connected by using the 0T1R switch cell 224 illustrated in FIG. 4(*a*), a forward bias voltage is applied across both ends of the variable resistance element. In other words, by applying a bias voltage higher than a predetermined threshold voltage across VL-HL, the variable resistance element is changed to the low resistance state (ON state). This rewriting operation is referred to as "set".

On the other hand, when the row wiring HL and the column wiring VL illustrated in FIG. 3 are disconnected using the 0T1R switch cell 224 illustrated in FIG. 4(*a*), a reverse bias voltage is applied across both ends of the variable resistance element. In other words, a current is allowed to flows from the row wiring HL to the column wiring VL, thereby changing the variable resistance element to a high resistance state (OFF state). This rewriting operation is referred to as "reset".

As illustrated in FIG. 4(*b*), the 2T1R switch cell 224 includes two variable resistance elements R1 and R2 connected in series between the row wiring HL and the column wiring VL and a transistor (cell transistor) whose drain is connected to a connection node of the variable resistance elements R1 and R2. A gate of the cell transistor is connected to a word line WL, and the source is connected to a bit line.

When the row wiring HL and the column wiring VL illustrated in FIG. 3 are connected by using the 2T1R switch cell 224 illustrated in FIG. 4(*b*), each of the variable resistance elements R1 and R2 is set to ON state. In other words, in a state in which the word line WL is activated to a high level, a forward bias voltage is applied across VL-BL to set the variable resistance element R1, and then, a bias voltage in the forward direction is applied across HL-BL to set the variable resistance element R2.

On the other hand, when the row wiring HL and the column wiring VL illustrated in FIG. 3 are disconnected using the 2T1R switch cell 224 illustrated in FIG. 4(*b*), the variable resistance elements R1 and R2 are reset to the OFF state. In other words, in a state in which the word line WL is activated to a high level, a reverse bias voltage is applied across VL-BL to reset the variable resistance element R1, and then, a reverse bias voltage is applied across HL-BL to reset the variable resistance element R2.

Figure 5:
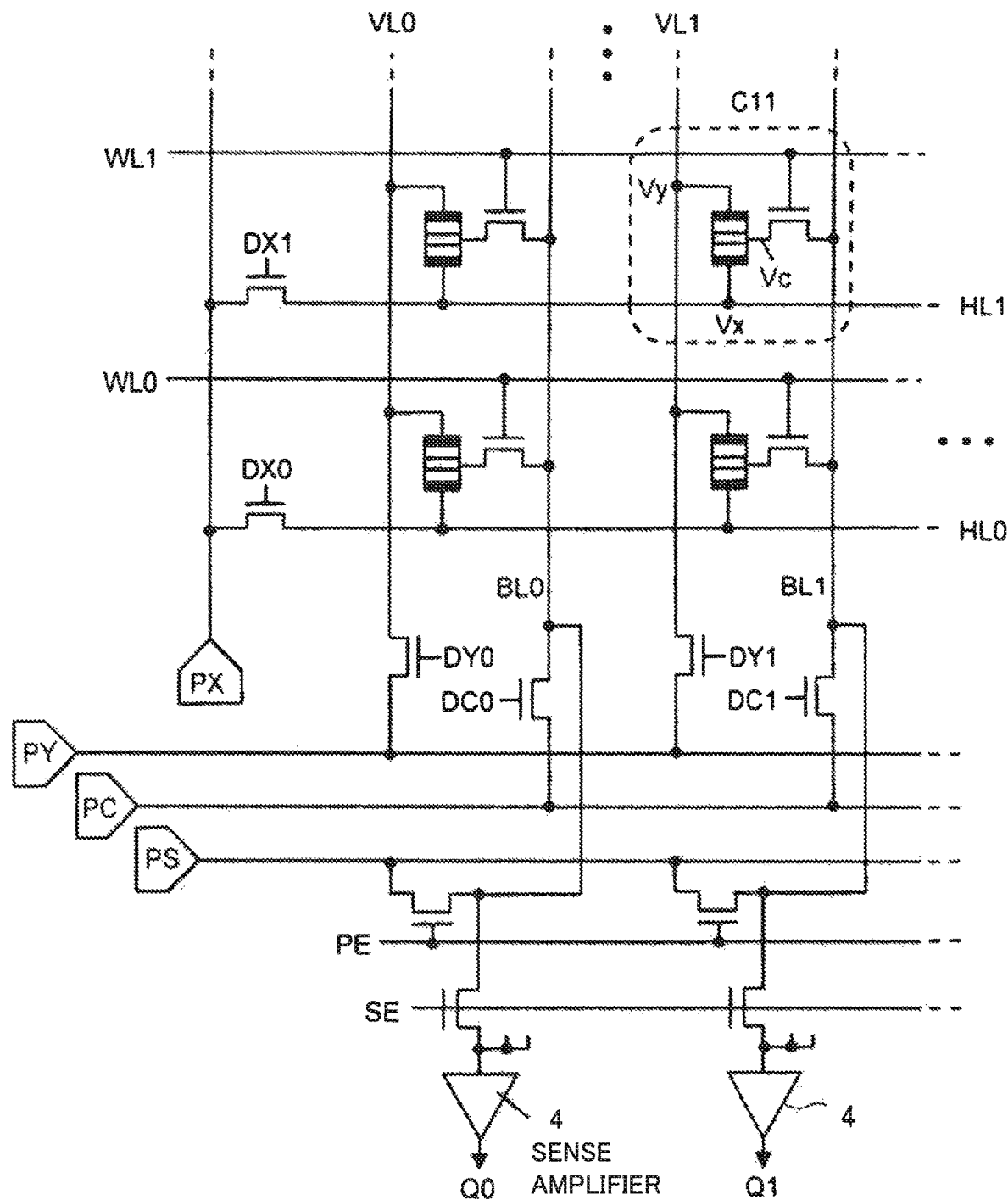
FIG. 5 is a circuit diagram illustrating a configuration example of a crossbar switch block including a 2T1R type switch cell.

Specific examples of the crossbar switch block using the 2T1R switch cell 224 include the configuration described in the above-described NPL1. FIG. 5 is a circuit diagram illustrating a configuration example of a crossbar switch block including a 2T1R switch cell. FIG. 5 illustrates a configuration example in which the circuit described in NPL1 is simplified to a 2-row 2-column crossbar switch block.

First, a writing operation to the switch cell 224 included in the first crossbar switch block 221 and the second crossbar switch block 222 illustrated in FIG. 3 will be described with reference to FIG. 5.

For example, it is assumed that a switch cell C11 illustrated in FIG. 5 is turned on to connect the row wiring HL1 and the column wiring VL1. In this case, the word line WL1 is activated to a high level, a cell transistor of the cell C11 is turned on, and the two variable resistance elements and the bit line BL1 are made conductive. The signals DX1, DY1, and DC1 are activated to a high level, and the row wiring HL1 and a drive circuit PX, the column wiring VL1 and a drive circuit PY, and the bit line BL1 and a drive circuit PC are connected, respectively.

The initial voltages of a voltage Vc supplied from a drive circuit PC, a voltage Vx supplied from a drive circuit PX, and a voltage Vy supplied from a drive circuit PY are all at a low level. When the voltage Vx is shifted to a high level, a bias voltage in the forward direction is applied to the variable resistance element R1, and an ON state is set. Thereafter, when the voltage Vx is returned to a low level and the voltage Vy is transited to a high level, a bias voltage in the forward direction is applied to the variable resistance element R2, and an ON state is set. Through the above-described operation, the row wiring HL1 and the column wiring VL1 are brought into a conductive state.

For example, it is assumed that the switch cell C11 illustrated in FIG. 5 is turned off, and the row wiring HL1 and the column wiring VL1 are disconnected. In this case, the initial voltages of the voltage Vc, the voltage Vx, and the voltage Vy are all at a high level. When the voltage Vx is changed to a low level, a bias voltage in the reverse direction is applied to the variable resistance element R1, and the bias state is reset to an OFF state. Thereafter, when the voltage Vx is returned to the high level and the voltage Vy is transited to the low level, the bias voltage in the reverse direction is applied to the variable resistance element R2, and an OFF state is reset. Through the above operation, the row wiring HL1 and the column wiring VL1 are in a non-conductive state.

Next, an operation (reading operation) for reading out the state of the switch cell C11 will be described with reference to FIG. 5.

When the state of the switch cell C11 illustrated in FIG. 5 is read out, a signal DY1 is first activated, and the column wiring VL1 and the drive circuit PY are connected. At this time, a low level voltage Vy is applied to the column wiring VL1. The signal SE is activated to connect the sense amplifier 4 to the bit line BL1, and the signal PE is activated to precharge the bit line BL1 to a high level. After deactivating the signal PE, the word line WL1 is activated to turn on a cell transistor of the switch cell C11. At this time, when the variable resistance element R1 is in the ON state, a charge on the bit line BL1 is discharged through the variable resistance element R1. Therefore, the potential of the bit line BL1 drops, and this potential change is detected by the sense amplifier 4. On the other hand, when the variable resistance element R2 is in an OFF state, a charge on the bit line BL1 is not discharged, and therefore, the potential of the bit line BL1 does not change.

Subsequently, after inactivating a signal DY1, a signal DX1 is activated to connect the row wiring HL1 and the drive circuit PX. At this time, a low level voltage Vx is applied to the row wiring HL1. Again, the signal PE is activated to precharge the bit line BL1 to a high level. After deactivating the signal PE, the word line WL1 is activated to turn on a cell transistor of the switch cell C11. At this time, when the variable resistance element R2 is in an ON state, a charge on the bit line BL1 is discharged via the variable resistance element R2. Therefore, the potential of the bit line BL1 drops, and this potential change is detected by the sense amplifier 4. On the other hand, when the variable resistance element R2 is in the OFF state, a charge of the bit line BL1 is not discharged, and therefore, the potential of the bit line BL1 does not change.

By the above-described operation, the states of the variable resistance elements R1 and R2 of the switch cell C11 are detected. When the variable resistance elements R1 and R2 are in the ON state, it is detected that the switch cell C11 is in the ON state, i.e., the column wiring VL1 and the row wiring HL1 are in the conductive state. On the other hand, when at least one of the variable resistance elements R1 and R2 is in the OFF state, it is detected that the cell C11 is in the OFF state, i.e., the column wiring VL1 and the row wiring HL1 are in a non-conductive state.

The programmable logic integrated circuit 1 of the present invention has at least three operation modes: a configuration mode in which configuration information is written in the programmable logic integrated circuit 1; a read mode for reading the configuration information written in the programmable logic integrated circuit 1; and an application mode in which the programmable logic integrated circuit 1 is operated based on the written configuration information.

Figure 6:
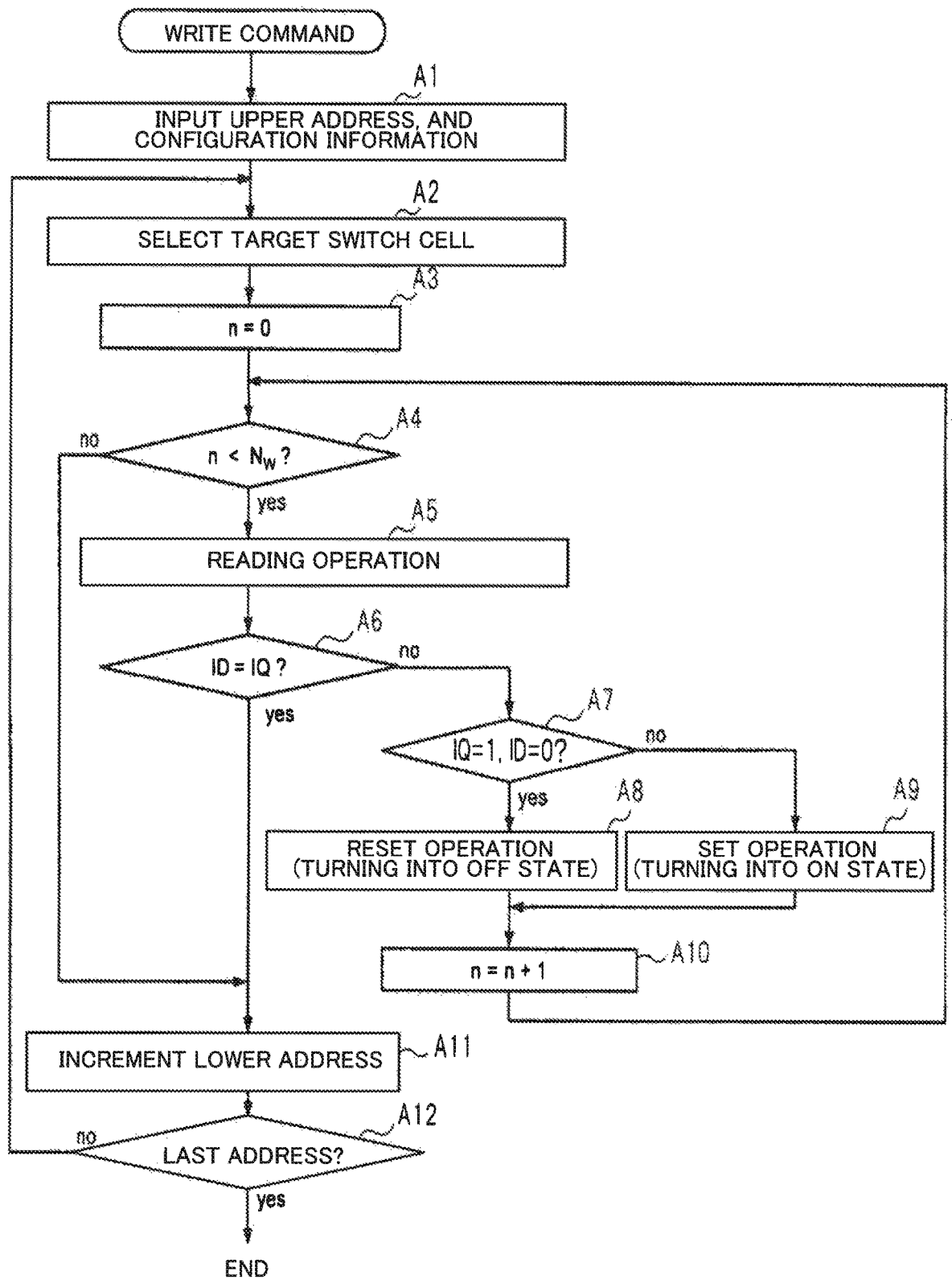
FIG. 6 is a flowchart illustrating an operation example of the configuration mode according to the first example embodiment.

FIG. 6 is a flowchart illustrating an operation example of the configuration mode of the first example embodiment. An operation in a configuration mode illustrated in FIG. 6 is controlled by the controller 7 illustrated in FIG. 1.

As illustrated in FIG. 6, when a write command is inputted from the outside to the programmable logic integrated circuit 1, address and configuration information of the switch cell (target cell) 224 to be rewritten is subsequently inputted (step A1). The input address is an upper address, and the configuration information of the switch cell 224 corresponding to the lower address is serially transferred and stored in the write buffer 5. In this example embodiment, it is assumed that an upper address corresponds to the row wiring, and the lower address corresponds to the column wiring. For example, the switch cell 224 to be accessed first is the switch cell 224 located at the intersection of the row wiring corresponding to the upper address and the column wiring having the lower address zero.

The controller 7 resets a variable n indicating the number of rewrites to 0 (step A3) when a target cell is in a selected state based on an inputted address (step A2). Next, it is determined whether or not the variable n has reached a predetermined constant Nw (step A4), and when the value of the variable n has not reached the predetermined constant Nw, the rewriting operation of the target cell is executed. The constant Nw is a preset number of rewritable times of the switch cell 224, and a typical value is about 16.

In the present example embodiment, the rewriting operation of a target cell is executed after the step (step A5) of reading out the state of the target cell. At this time, the controller 7 compares a read result IQ outputted from the sense amplifier 4 with a write data ID of the target cell outputted from the write buffer 5 (step A6), and when they match, the controller 7 does not execute the rewriting operation of the target cell. On the other hand, when the read result IQ and the write data ID do not match, it is determined whether IQ=1 (ON state), ID=0 or not (step A7), and when IQ=1 and ID=0, the target cell is reset to an OFF state (step A8). When IQ=0 (OFF state) and ID=1, the target cell is set to the ON state (step A9). When a set or reset operation is executed, the controller 7 increments the value of the variable n by 1 (step A10). Then, returning to the processing of the step A4, it is determined whether or not the variable n has reached a predetermined constant Nw, and when the value of the variable n has not reached the predetermined constant Nw, the processing from the step A5 is repeated again.

When the variable n has reached the constant Nw in the processing of the step A4 or when the read result IQ and the write data ID coincide with each other in the processing of the step A6, the controller 7 increments the lower address by 1 (step A11). It is determined whether or not the final address has been reached (step A12), and when the final address has been reached, the operation in the configuration mode at one upper (row) address inputted together with the write command is terminated. In this case, when a write command is inputted again from the outside and another upper (row) address is inputted, a rewriting operation of the configuration information is executed according to the flowchart illustrated in FIG. 6. On the other hand, when the last address has not been reached in the step A12, the controller 7 repeats the processing from the step A2 again.

According to the operation in the configuration mode described above, since the state of the target cell is read first and the rewriting operation of a switch cell is executed only when the state is different from the write data, the number of times of rewriting of the variable resistance element can be suppressed to a minimum.

For example, it is assumed that new configuration information is configured after resetting all the switch cells 224 once. In this case, there is a possibility that the switch cell 224 that has been in the ON state is temporarily reset, transited to the OFF state, and then set again to the ON state. Originally, the variable resistance element of the switch cell 224 is an element which does not need to rewrite the state, but the rewriting operation is wastefully executed twice in the operation process in the configuration mode. Suppressing the number of times of rewriting of the variable resistance element by the above-described method substantially increases the utilization period of the programmable logic integrated circuit 1, and therefore, the reliability can be improved.

Figure 7:
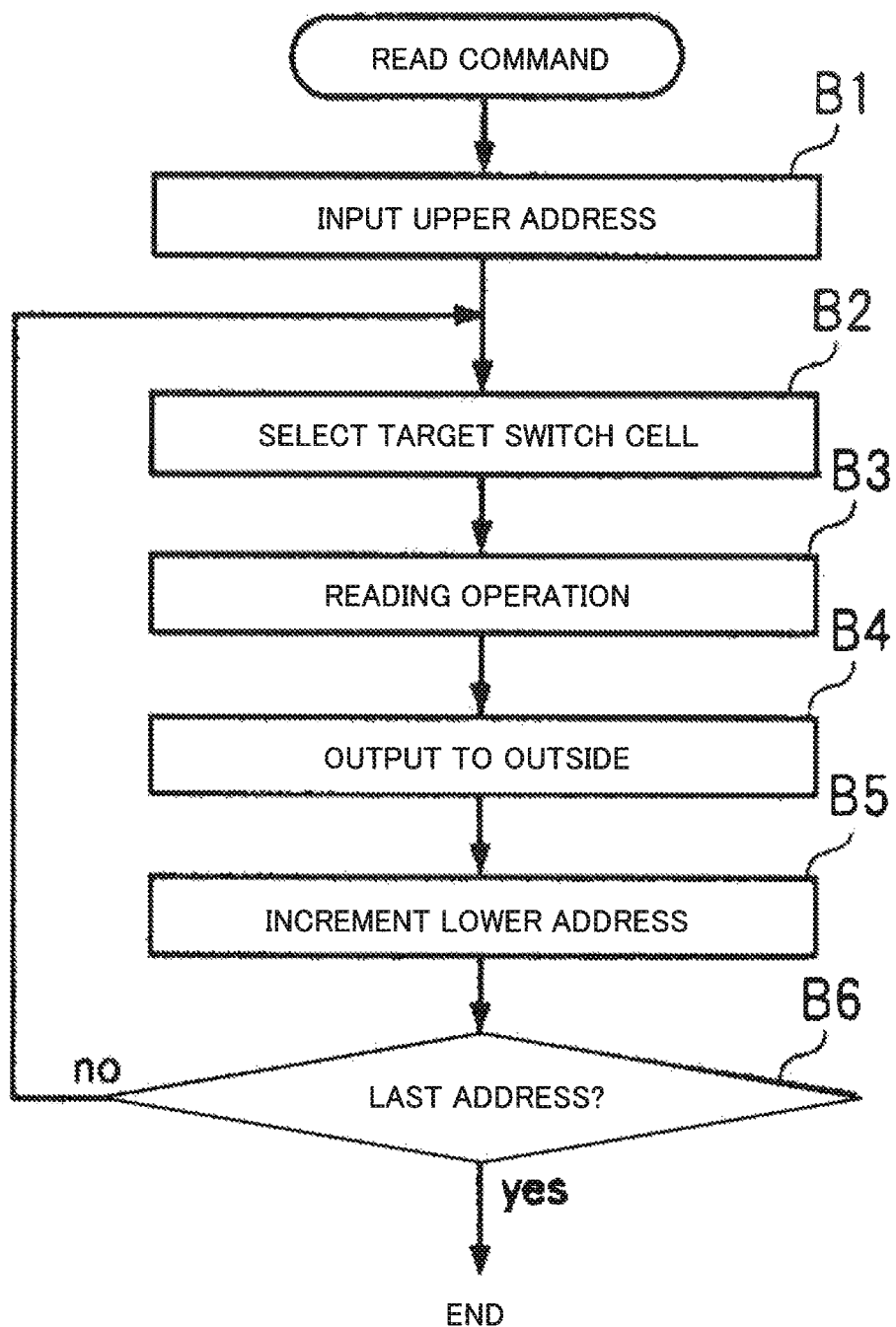
FIG. 7 is a flowchart illustrating an operation example of a read mode according to the first example embodiment.

FIG. 7 is a flowchart illustrating an operation example of the read mode according to the first example embodiment. The operation in the read mode illustrated in FIG. 7 is controlled by the controller 7 illustrated in FIG. 1.

As illustrated in FIG. 7, when a read command is inputted from outside to the programmable logic integrated circuit 1, the upper address of the switch cell (target cell) 224 to be read is subsequently inputted (step B1).

The controller 7 starts a reading operation (step B3) and temporarily stores the read result IQ outputted from the sense amplifier 4 in the read buffer 6 when a target cell is in a selected state based on the inputted upper address (step B2). The read result read from the read buffer 6 is outputted to the outside as data Q via the external I/F circuit (step B4). The controller 7 increments the lower address (step B5), determines whether the final address has been reached (step B6), and repeats the above reading operation until reaching the final address.

Figure 8:
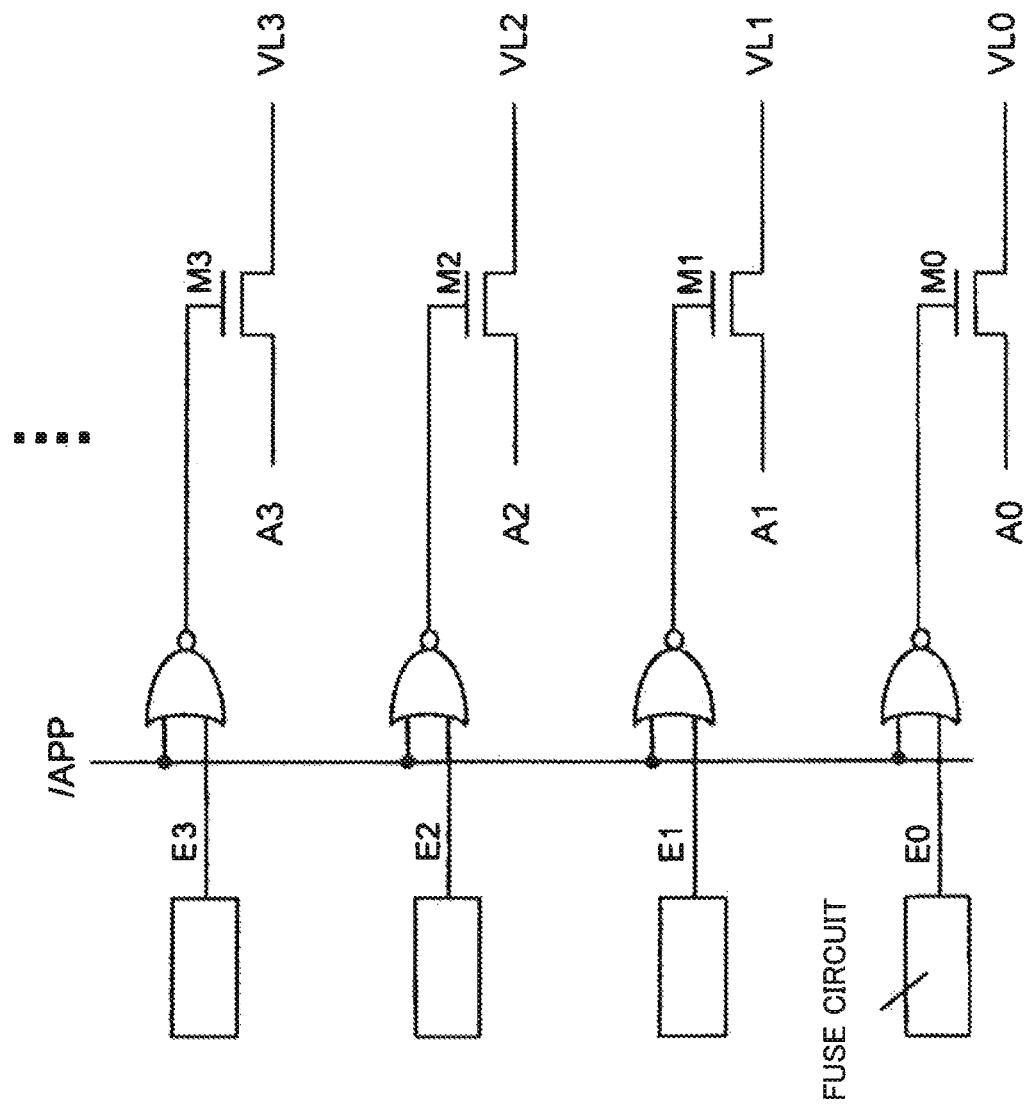
FIG. 8 is a circuit diagram illustrating a configuration example of the connection switch block illustrated in FIG. 3.

FIG. 8 is a circuit diagram illustrating one configuration example of the connection switch block illustrated in FIG. 3.

The connection switch block 223 temporarily disconnects the input wirings A0 to A3 and the column wirings VL0 to VL6 in the configuration mode and the read mode of the programmable logic integrated circuit 1. This can avoid contention between an output voltage from the other segment and a bias voltage applied at the time of writing and reading.

In the application mode of the programmable logic integrated circuit 1, the connection switch block 223 electrically disconnects the column wiring VL connected to the switch cell (defective switch) which caused a write failure from an input wiring A. As a result, even when an ON-fixed switch cell different from written configuration information is generated, it is possible to avoid a malfunction due to a wiring short-circuited via the defective switch. An operation of the connection switch block 223 is controlled by the controller 7.

Fuse circuits E0 to E3 illustrated in FIG. 8 are provided for the column wirings VL0 to VL3, respectively, and hold values indicating the presence/absence of a defective switch generated in the corresponding column wirings VL0 to VL3, respectively. The default value of each of the fuse circuits E0 to E3 is 0 (for example, low level), which corresponds to a case in which no defective switch exists in the corresponding column wiring. When a defective switch is generated, the value of the fuse circuit corresponding to the column wiring including the defective switch is set to 1 (for example, high level).

In the configuration mode and the read mode (/APP=1), a transistor M0 is turned off irrespective of the value of the fuse circuit E0, and the input wiring A0 and the column wiring VL0 are in a non-conductive state. When there is no defective switch in the column wiring VL0 (E0=0), in the application mode (/APP=0), the transistor M0 is turned on and the input wiring A0 and the column wiring VL0 are in a conductive state. On the other hand, when a defective switch exists in the column wiring VL0 (E0=1), the transistor M0 is turned off, and the input wiring A0 and the column wiring VL0 are in a non-conductive state.

The fuse circuits E0 to E3 function as a memory element that holds a value indicating the presence or absence of a defective switch and a switch element that connects or disconnects the input wiring and the first crossbar switch block 221.

Figure 9:
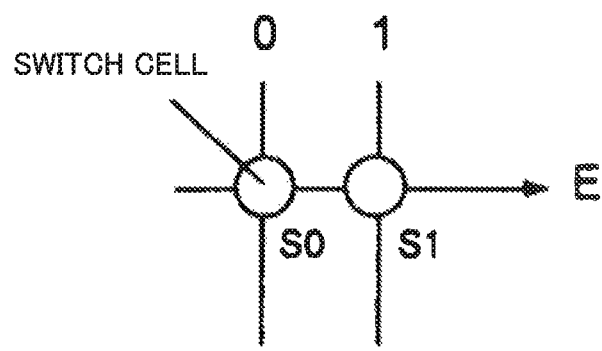
FIG. 9 is a circuit diagram illustrating a configuration example of the fuse circuit illustrated in FIG. 8.
Figure 9:
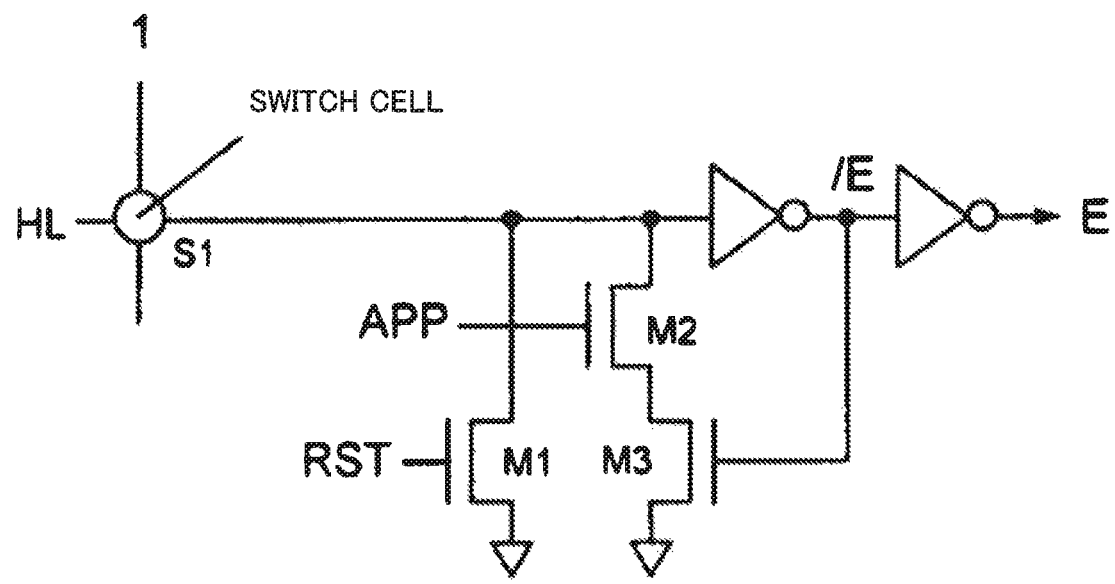

FIG. 9 is a circuit diagram illustrating a configuration example of the fuse circuit illustrated in FIG. 8.

A fuse circuit illustrated in FIG. 9(a) comprises two switch cells S0 and S1. The switch cell S0 connects or disconnects a ground line 0 (row wiring) and an output line E (column wiring), and the switch cell S1 connects or disconnects a power supply line 1 (column wiring) and the output line E.

In the switch cells S0 and S1, for example, the variable resistance element illustrated in FIG. 4 is used. In order to set the value of the fuse circuit illustrated in FIG. 9(a) to 0, the switch cell S0 is set to the ON state and the switch cell S1 is reset to the OFF state (this is the default state). In order to set the value of the fuse circuit illustrated in FIG. 9(a) to 1, the switch cell S0 is reset to the OFF state and the switch cell S1 is reset to the ON state.

The fuse circuit illustrated in FIG. 9(a) is the simplest configuration example. However, in the fuse circuit illustrated in FIG. 9(a), since the default state (initial state) of the variable resistance element is OFF, either switch cell S0 or S1 must be necessarily set.

The fuse circuit illustrated in FIG. 9(b) is a configuration example including one switch cell S1. The switch cell S1 connects or disconnects the power supply line 1 (column wiring) and the row wiring HL. In order to set the value of the fuse circuit illustrated in FIG. 9(b) to 0, the switch cell S1 is reset to the OFF state, and in order to set the value of the fuse circuit to 1, the switch cell S1 is set to the ON state. In the fuse circuit illustrated in FIG. 9(b), since the default state (initial state) of the variable resistance element is OFF, only when a defective switch is discovered by subsequent inspection or the like, and it is necessary to set the fuse circuit to 1, the switch cell S1 may be set.

In the fuse circuit illustrated in FIG. 9(b), in order to prevent the potential of the HL wiring from becoming undefined when the switch cell S1 is off (default state), it is needed to temporarily reset the fuse when entering the application mode.

For example, when RST=1, the transistor M1 is turned on to lower the row wire HL to a low level (0). In the application mode (APP=1), since the transistors M2 and M3 are in the ON state, HL=0 is retained even when RST is returned to 0 as long as the switch cell S1 is in the OFF state. In other words, the fuse circuit outputs 0. On the other hand, when RST is returned to 0 when the switch cell S1 is in the ON state, HL=1 is set. In other words, the fuse circuit outputs 1.

Figure 10:
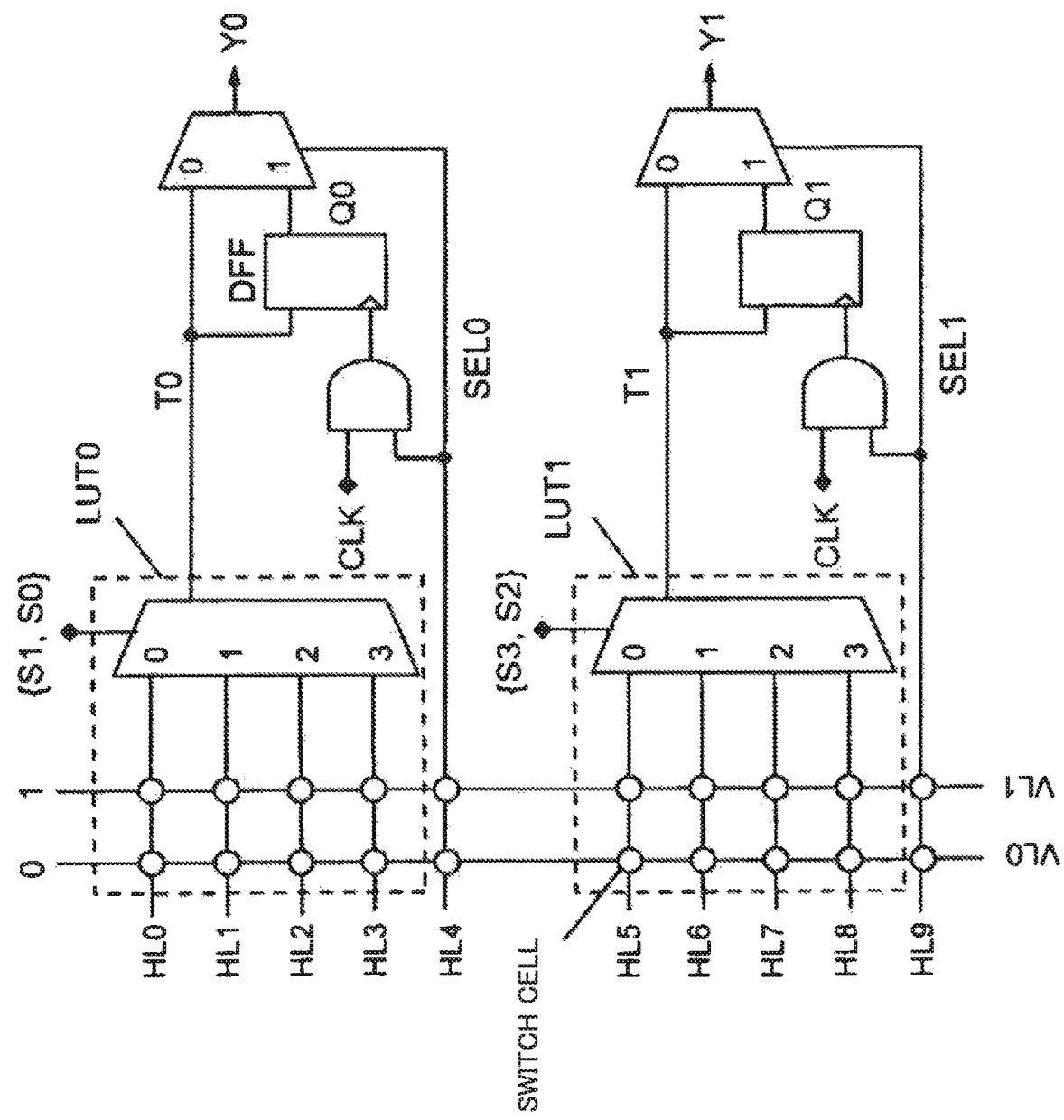
FIG. 10 is a circuit diagram illustrating a configuration example of the logic block illustrated in FIG. 3.

FIG. 10 is a circuit diagram illustrating a configuration example of the logic block illustrated in FIG. 3. The programmable logic integrated circuit 1 includes two two-input lookup tables (LUT0, LUT1) in the logic block 21.

From the output Y0 of the logic block 21, one of the output T0 of the LUT0 or the output Q0 of the D-flip-flop (DFF) to which T0 is inputted is selected and outputted by the signal SEL0. Similarly, from the output Y1 of the logic block 21, one of the output T1 of the LUT1 and the output Q1 of the DFF to which the input T1 is inputted is selected and outputted by the signal SEL1. The row wirings HL0 to HL3 are inputted to the LUT0, and the row wirings HL5 to HL8 are inputted to the LUT1. The row wirings HL0 to HL8 are pulled up (1 fixed value) or pulled down (0 fixed value) according to truth value information set in the LUT0 and the LUT1 by the switch cell including the variable resistance element. For example, when the row wiring HL0=0, the row wiring HL1=0, the row wiring HL2=0, the row wiring HL3=1, the AND logic is outputted from the LUT0. The row wirings HL4 and HL9 are pulled up or pulled down corresponding to the values of SEL0 and SEL1, respectively.

Note that, in FIG. 10, for ease of explanation, a configuration example in which the logic block 21 includes two two-input lookup tables is illustrated. In a general logic block 21, a three-input lookup table or a four-input lookup table is used. A general logic block 21 comprises about eight look-up tables.

Incidentally, as described above, the defects generated in the variable resistance element include a reset failure (ON-fixed) that cannot be rewritten to the OFF state and a set failure (OFF-fixed) that cannot be rewritten to the ON state.

Figure 11:
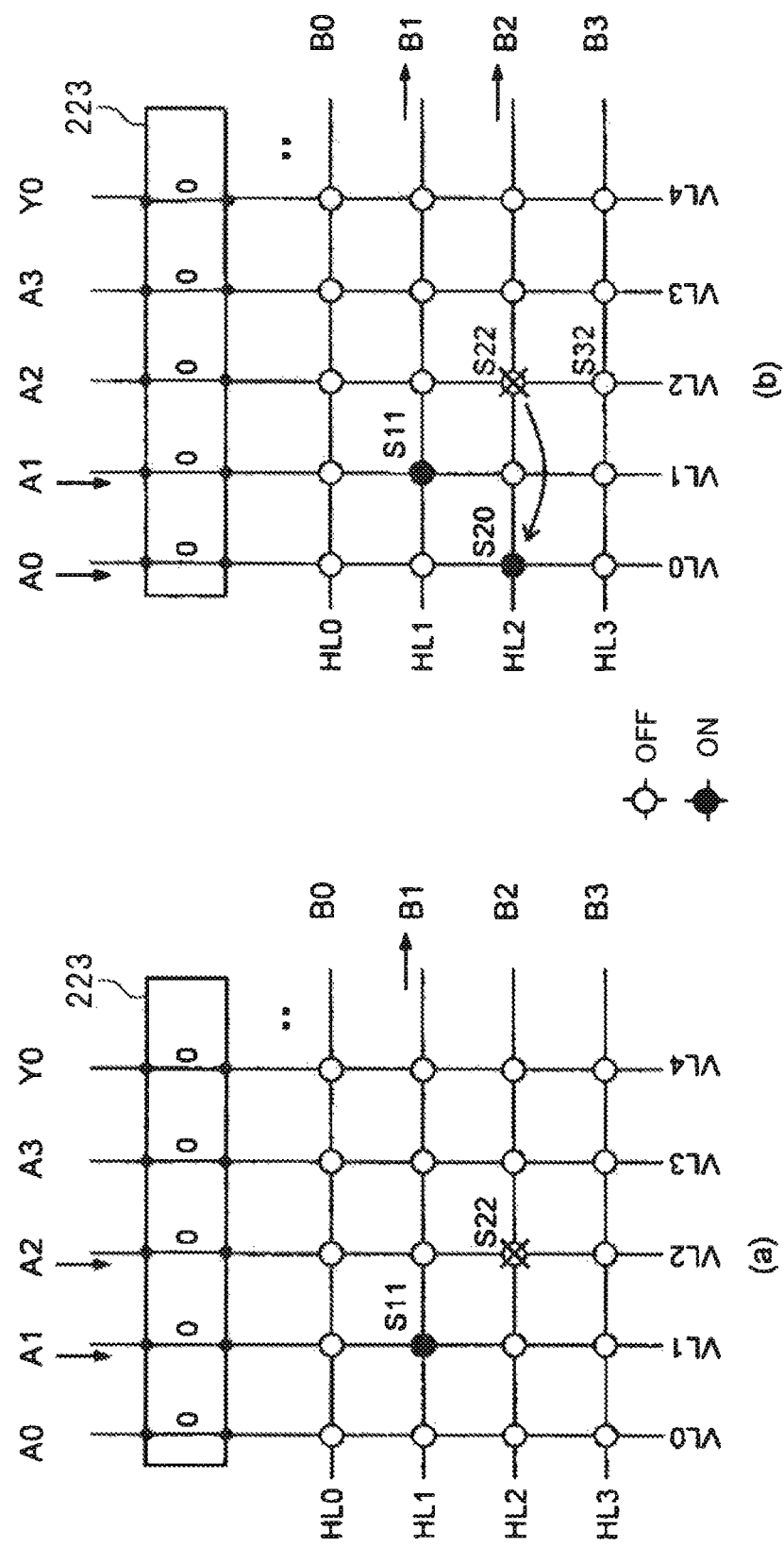
FIG. 11 is a schematic diagram illustrating an example of occurrence of a set failure (OFF-fixed) in a switch cell included in a crossbar switch block and an example of a countermeasure method thereof.

FIG. 11 is a schematic diagram illustrating an example of a case in which a set failure (OFF-fixed) is generated in a switch cell included in a crossbar switch block, and an example of a countermeasure method thereof. Here, an example will be described in which the wiring A1 and the wiring B1 are connected in accordance with the configuration information and the wiring A2 and the wiring B2 are connected. In this case, in order to connect the wiring A1 and the wiring B1, the switch cell S11 is rewritten to the ON state, and the switch cell S22 is rewritten to the ON state to connect the wiring A2 and the wiring B2. It is assumed that all the other switch cells other than the switch cells S11 and S22 are rewritten to the OFF state.

FIG. 11(a) illustrates an example in which a set failure occurs in the switch cell S22. In this case, a malfunction occurs in which a signal cannot be transmitted from the wiring A2 to the wiring B2.

In order to avoid the above malfunction, the configuration information may be changed to form a bypass route as illustrated in FIG. 11(b), for example. FIG. 11(b) illustrates a state in which the switch cell S20 is set to the on state and the path from the wire A2 to the wire B2 is changed to the detour path from the wire A0 to the wire B2. In this case, the configuration information of the other logic block 21 is also changed in such a manner to output a signal to the wiring A0 instead of the wiring A2 with respect to the crossbar switch block illustrated in FIG. 11(b).

As another alternative path candidate, it is conceivable to set the switch cell S32 in the ON state to form a path from the wiring A2 to the wiring B3. In this case, the configuration information of the other logic block 21 is also changed in such a manner to input a signal to the wiring B3 instead of the wiring B2 with respect to the crossbar switch block illustrated in FIG. 11(b).

When a set failure occurs, the switch cell 224 in which the set failure has occurred cannot be used, but the set failure does not affect the row wiring or the column wiring to which the switch cell 224 is connected. Therefore, when changing the configuration information, a detour path may be formed in such a manner not to use the switch cell 224 in which a set failure has occurred. When a set failure occurs, the connection switch block 223 does not need to disconnect the column wiring VL2 including the defective set switch cell 224 from the input wiring A2. Therefore, the set value of the fuse circuit E2 of the connection switch block 223 illustrated in FIG. 8 can be left as 0.

Figure 12:
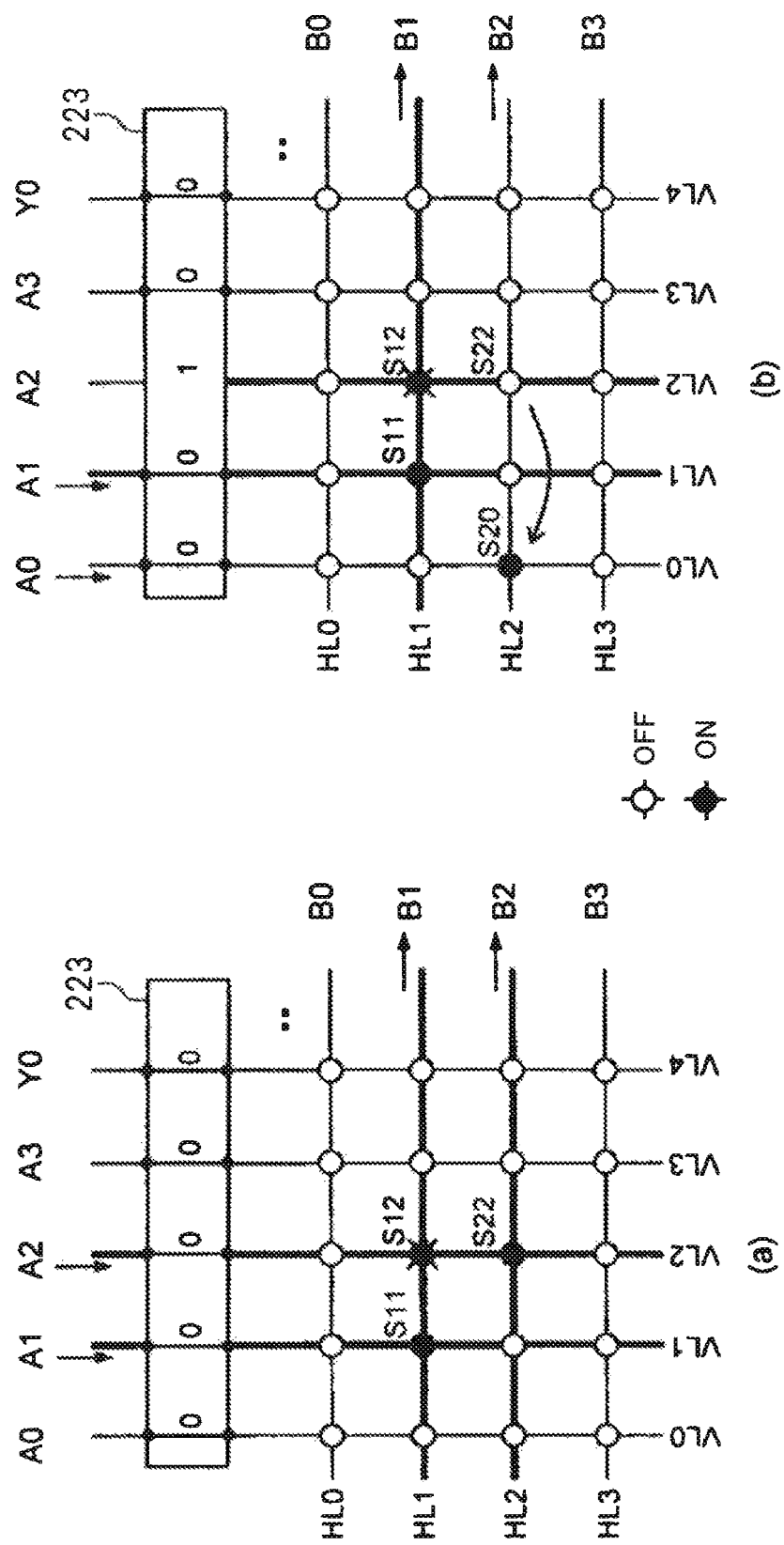
FIG. 12 is a schematic diagram illustrating an example of occurrence of a reset failure (ON-fixed) in a switch cell included in a crossbar switch block and an example of a countermeasure method thereof.

FIG. 12 is a schematic diagram illustrating an example of occurrence of a reset failure (ON-fixed) in a switch cell included in a crossbar switch block, and an example of a countermeasure method thereof. Here, an example will be described in which the wiring A1 and the wiring B1 are connected and the wiring A2 and the wiring B2 are connected in accordance with the configuration information as in the case of the occurrence of the set failure illustrated in FIG. 11. In this case, in order to connect the wiring A1 and the wiring B1, the switch cell S11 is rewritten to the ON state, and the switch cell S22 is rewritten to the ON state to connect the wiring A2 and the wiring B2. It is assumed that all the other switch cells other than the switch cells S11 and S22 are rewritten to the OFF state.

FIG. 12(a) illustrates an example in which a reset failure occurs in the switch cell S12. In this case, the four wirings VL1, HL1, VL2, HL2 are short-circuited by the switch cells S11, S12, S22 in the ON state. In other words, a malfunction occurs in which the wirings A1, A2, B1, and B2 are short-circuited.

In order to avoid the above malfunction, it is needed to change the configuration information to form a detour path and disconnect the column wiring VL2 including the switch cell in which the reset failure occurred from the input wiring A2. FIG. 12(b) illustrates an example in which the switch cell S20 is set in the on state and the path from the wiring A2 to the wiring B2 is changed to a detour path from the wiring A0 to the wiring B2. In FIG. 12(b), the fuse circuit E2 of the connection switch block 223 is changed to 1 and the wiring A2 and the wiring VL2 are electrically disconnected. By changing the configuration information in this manner, a signal path from the wiring A1 to the wiring B1 and a signal path from the wiring A0 to the wiring B2 are established.

As described above, when a reset failure occurs, a row wiring or a column wiring including the switch cell 224 in which the reset failure has occurred causes a failure (uncontrolled failure) inadvertently short-circuiting with another row wiring or a column wiring through the switch cell 224. Therefore, it is needed to configure a detour path in such a manner not to use the switch cell 224 with a reset failure and the column wiring (or the row wiring) to which the switch cell is connected. It is needed to set a fuse circuit of the connection switch block 223 in such a manner to disconnect the column wiring including the switch cell 224 with the reset failure from the input wiring.

Second Example Embodiment

Figure 13:
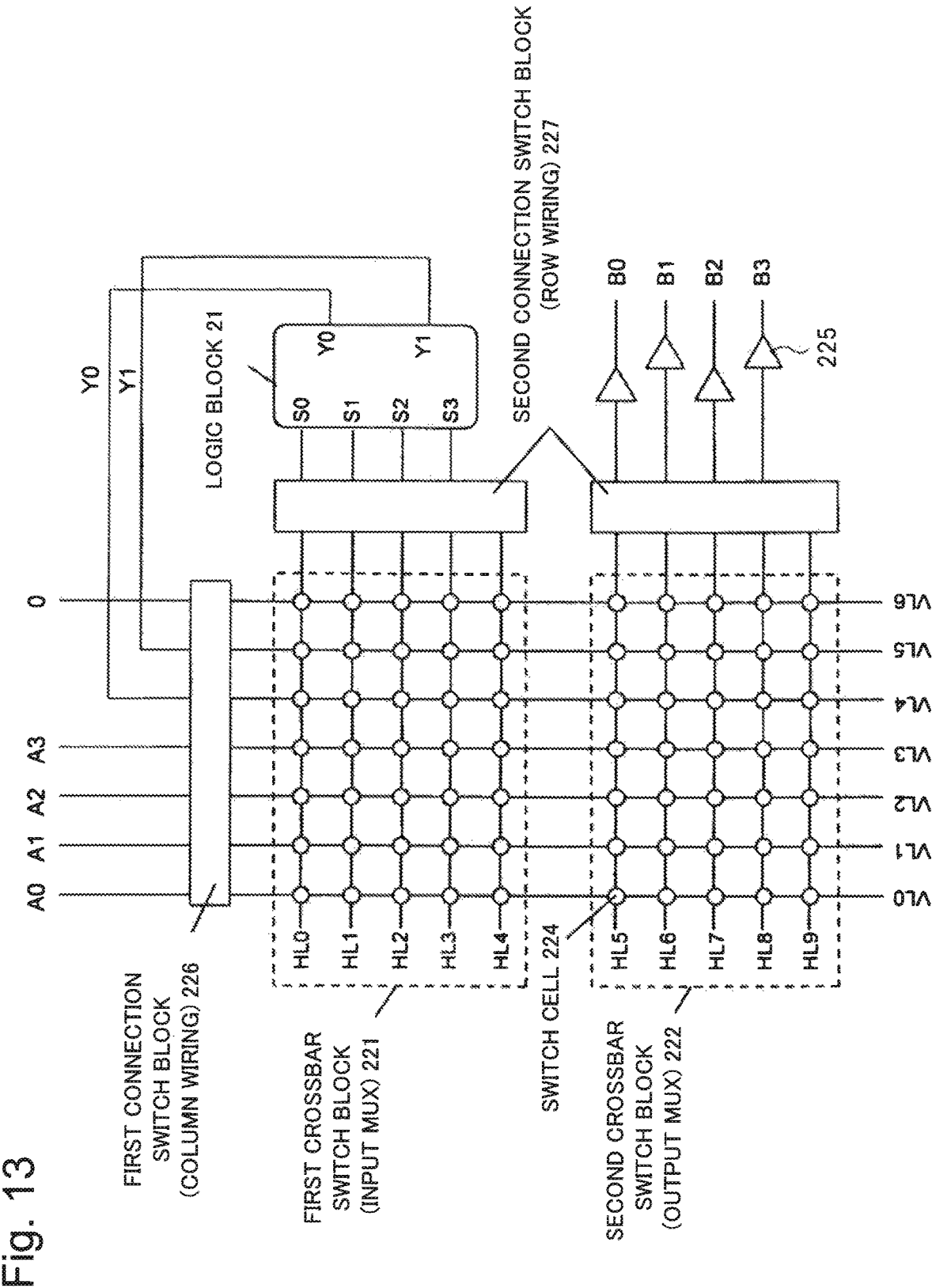
FIG. 13 is a block diagram illustrating a configuration example of a segment included in a programmable logic integrated circuit according to a second example embodiment.

FIG. 13 is a block diagram illustrating a configuration example of segments included in the programmable logic integrated circuit according to the second example embodiment.

As illustrated in FIG. 13, the programmable logic integrated circuit 1 of the second example embodiment is different from the first example embodiment in that the programmable logic integrated circuit has a second connection switch block 227 for connecting or disconnecting the row wirings HL0 to HL9 and the input terminal of the logic block 21 and the input terminal of the output buffer in addition to a connection switch block (first connection switch block 226) for connecting or disconnecting the input wirings A0 to A3, the output wirings Y0 to Y1 and the ground line and the column wirings VL0 to VL6. The first crossbar switch block 221 comprises a redundant row wiring (first redundant wiring) HL4 extending in the first direction, and the second crossbar switch block 222 comprises a redundant row wiring (first redundant wiring) HL9 extending in the first direction.

The second connection switch block 227 comprises a memory element for holding a value indicating the presence/absence of a defective switch and a fuse circuit for functioning as a switch element. Other configurations of the segments are similar to those of the first example embodiment illustrated in FIG. 5.

Figure 14:
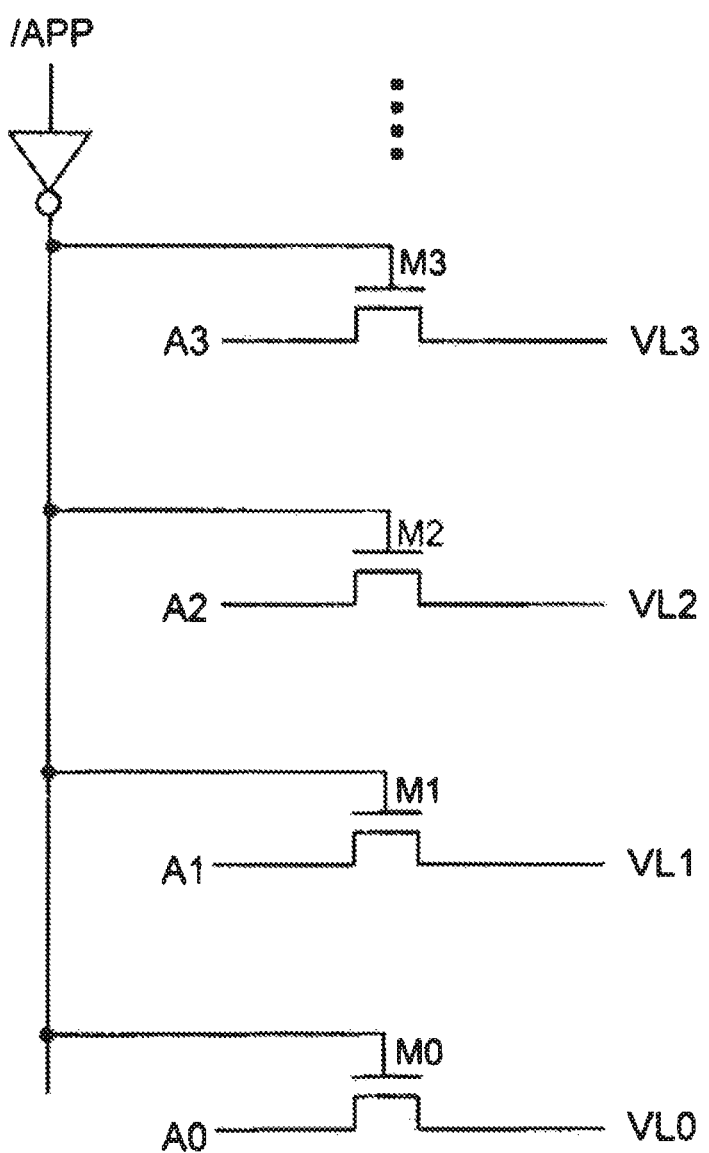
FIG. 14 is a circuit diagram illustrating a configuration example of a first connection switch block illustrated in FIG. 13.

FIG. 14 is a circuit diagram illustrating a configuration example of the first connection switch block illustrated in FIG. 13.

The first connection switch block 226 temporarily connects or disconnects input wirings A0 to A3, output wirings Y0 to Y1, and a ground line and column wirings VL0 to VL6 in the configuration mode and the read mode (/APP=1). Consequently, contention between the output voltage from the other segment and the bias voltage applied at the time of writing and reading can be avoided.

In the application mode (/APP=0), the first connection switch block 226 connects the input wirings A0 to A3, the output wirings Y0 to Y1, and the ground line to the column wirings VL0 to VL6. Unlike the connection switch block 223 of the first example embodiment, the first connection switch block 226 does not have the function of separating the column wiring including the defective switch from the input wiring.

Figure 15:
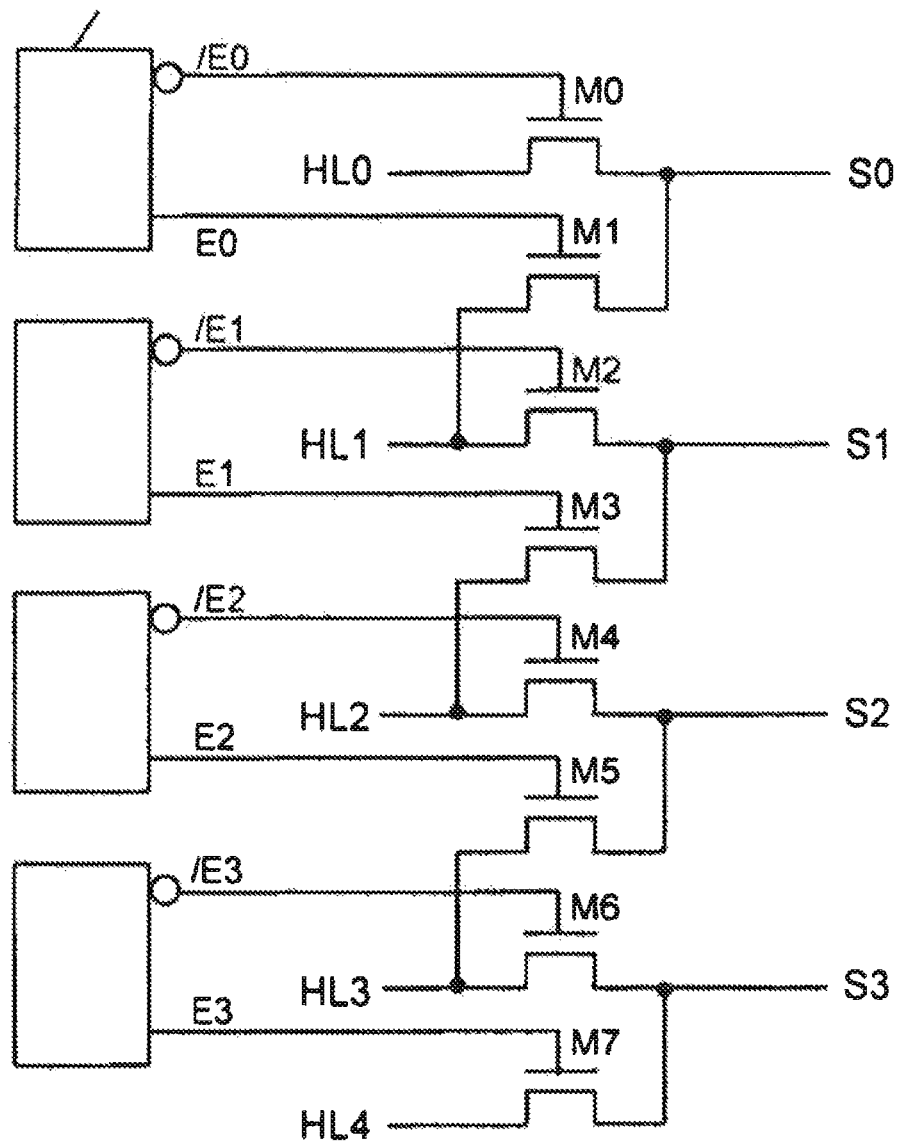
FIG. 15 is a circuit diagram illustrating a configuration example of a second connection switch block illustrated in FIG. 13.

FIG. 15 is a circuit diagram illustrating a configuration example of the second connection switch block illustrated in FIG. 13

When a failure occurs in the switch cell 224 included in the crossbar switch block, the second connection switch block 227 replaces the row wiring to which the switch cell (defective switch) 224 is connected with an adjacent row wiring. For example, when a failure switch has not occurred in the first crossbar switch block 221 and the second crossbar switch block 222, transistors M0, M2, M4, and M6 are turned on, transistors M1, M3, M5, and M7 are turned off, and the row wirings HL0 to HL3 are connected to the output wirings S0 to S3.

On the other hand, for example, when a defective switch is generated in the switch cell 224 of the row wiring HL2, transistors M0, M2, M5, and M7 are turned on, transistors M1, M3, M4, and M6 are turned off, the row wiring HL2 is replaced with HL3, and the row wiring HL3 is replaced with HL4. That is, the row wiring HL0 is connected to the output wiring S0, the row wiring HL1 is connected to the output wiring S1, the row wiring HL3 is connected to the output wiring S2, the row wiring HL4 is connected to the output wiring S3 and the row wiring HL2 including the defective switch is not connected to any output wiring.

Connection information of the first connection switch block 226 and the second connection switch block 227 is stored in the fuse circuit illustrated in FIG. 9. The fuse circuit is provided for each of the column wirings and the row wirings, and the second connection switch block 227 determines whether or not to replace a corresponding row wiring with an adjacent row wiring according to a setting value of the fuse circuit. For example, when E=0, the corresponding row wiring is not replaced with an adjacent row wiring, and when E=1, the corresponding row wiring is replaced with an adjacent row wiring.

When no defective switch is generated in the first crossbar switch block 221 and the second crossbar switch block 222, all the fuse circuits E0 to E3 are set to 0. When the row wirings are numbered in ascending order and a defective switch has occurred in the first crossbar switch block 221 and the second crossbar switch block 222, the fuse circuit of the row wiring including the defective switch and the fuse circuit of the row wiring larger by one than the row wiring thereof are set to 1. For example, when a defective switch is generated in the row wiring HL2, E0=0, E1=0, E2=1, and E3=1.

Figure 16:
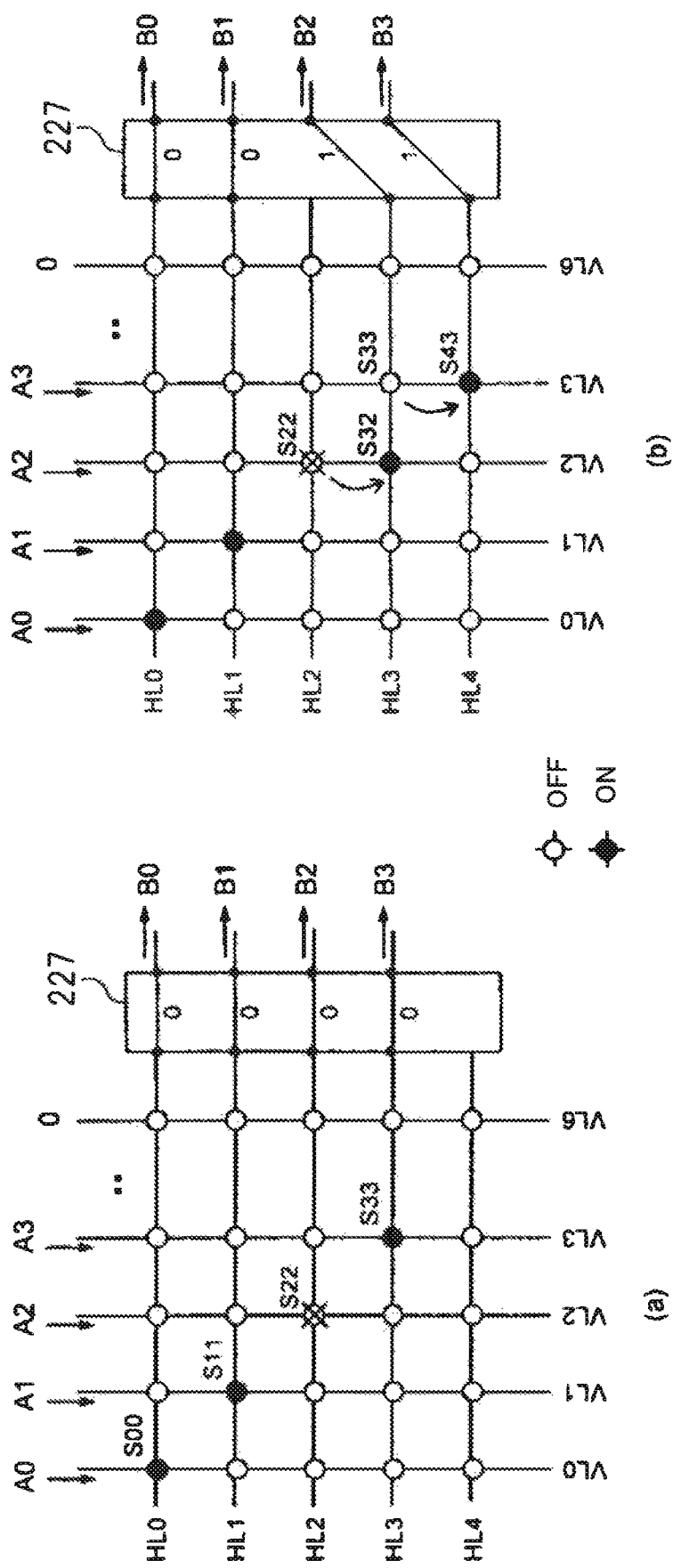
FIG. 16 is a schematic diagram illustrating an example of occurrence of a set failure (OFF-fixed) in a switch cell included in a crossbar switch block, and an example of a countermeasure method thereof.

FIG. 16 is a schematic diagram illustrating an example of a case in which a set failure (OFF-fixed) occurs in a switch cell provided in a crossbar switch block, and an example of a countermeasure method thereof.

Here, an example will be described in which the wiring A0 and the wiring B0 are connected according to the configuration information, the wiring A1 and the wiring B1 are connected, the wiring A2 and the wiring B2 are connected, and the wiring A3 and the wiring B3 are connected. In this case, the switch cells S00, S11, S22, and S33 are rewritten to the ON state, and all the other switch cells are rewritten to the OFF state. FIG. 16(a) illustrates a state in which a set failure occurs in the switch cell S22. In this case, a malfunction occurs in which a signal cannot be transmitted from the wiring A2 to the wiring B2.

In order to avoid the above-mentioned malfunction, the detour path may be formed by changing the configuration information as illustrated in FIG. 16(b), for example. In the example illustrated in FIG. 16(b), the switch cell S32 is switched to the ON state instead of the switch cell S22, and the switch cell S43 is switched to the ON state instead of the switch cell S33. In the second connection switch block 227, the row wiring HL3 and the wiring B2 are connected, and the fuse circuit is set so that the row wiring HL4 and the wiring B3 are connected to each other. In other words, configuration information is changed to E0=0, E1=0, E2=1, and E3=1. By changing the above configuration information, the wiring A2 and the wiring B2 are in a conductive state, and therefore a desired signal path can be secured.

Figure 17:
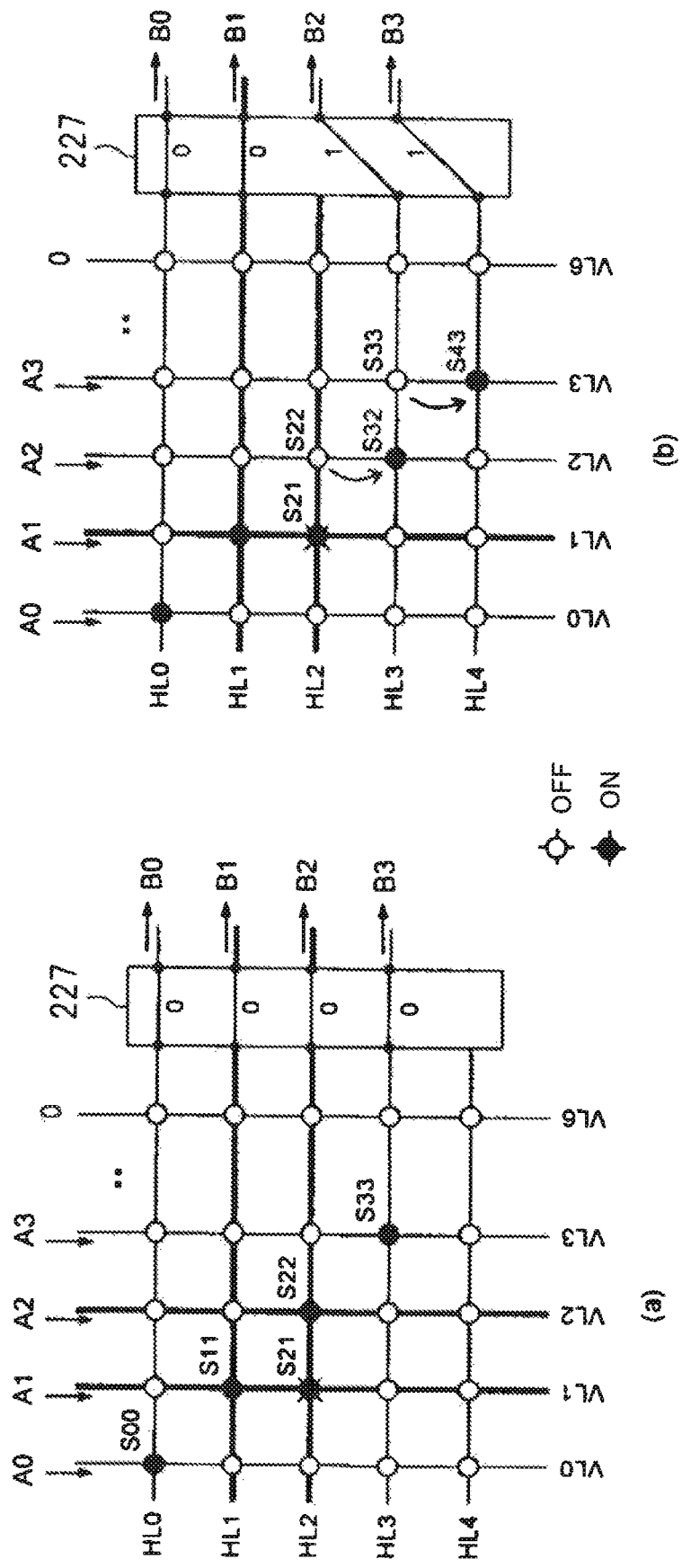
FIG. 17 is a schematic diagram illustrating an example of occurrence of a reset failure (ON-fixed) in a switch cell included in a crossbar switch block and an example of a countermeasure method thereof.

FIG. 17 is a schematic diagram illustrating an example of occurrence of a reset failure (ON-fixed) in a switch cell included in a crossbar switch block and an example of a countermeasure method thereof. Here, as in the case of the set failure illustrated in FIG. 16, an example will be described in which the wiring A0 and the wiring B0 are connected according to the configuration information, the wiring A1 and the wiring B1 are connected, the wiring A2 and the wiring B2 are connected, and the wiring A3 and the wiring B3 are connected. In this case, the switch cells S00, S11, S22, and S33 are rewritten to the ON state, and all the other switch cells are rewritten to the OFF state.

FIG. 17(a) illustrates a state in which a reset failure occurs in the switch cell S21. In this case, the four wirings VL1, HL1, VL2, HL2 are short-circuited by the switch cells S11, S21, S22 in the ON state. In other words, the wirings A1, A2, B1, B2 are short-circuited, and a failure occurs in which signals cannot be normally transmitted from the wiring A1 to the wiring B1 and from the wiring A2 to the wiring B2.

In order to avoid the above-described malfunction, the configuration information may be changed, for example, as illustrated in FIG. 17(b) to form a detour path. In the example illustrated in FIG. 17(b), the configuration information is changed in such a manner that the switch cell S32 instead of the switch cell S22 is switched to the ON state, and the switch cell S43 instead of the switch cell S33 is switched to the ON state. In the second connection switch block 227, the fuse circuit is set in such a manner that the row wiring HL3 is connected to the output wiring B2 and the row wiring HL4 is connected to the output wiring B3. That is, E0=0, E1=0, E2=1, and E3=1.

When this change is made, short-circuiting between the row wirings HL1 and HL2 cannot be eliminated, but since the row wiring HL2 is disconnected from the output wiring B2, the above trouble can be avoided. Therefore, the input wiring A1 and the output wiring B1, the input wiring A2 and the output wiring B2 are brought into a conductive state, and a desired signal path can be secured.

According to the second example embodiment, the connection relation between the input wiring and the output wiring in one segment can be maintained without changing. This means that there is no need to change the configuration information of other segments, and therefore, there is an advantage that only the configuration information of the segment in which a failure has occurred needs to be changed.

Third Example Embodiment

Figure 18:
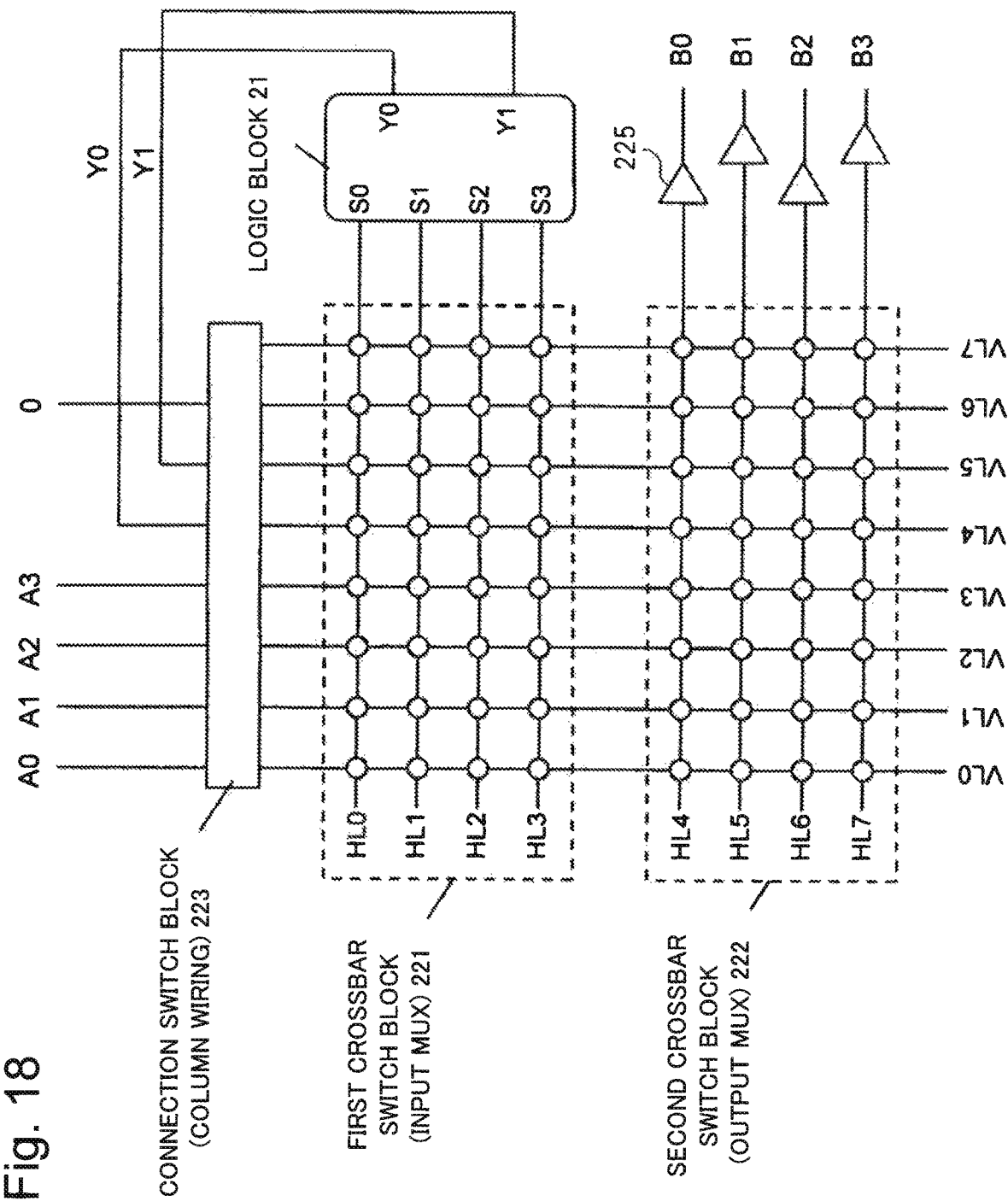
FIG. 18 is a block diagram illustrating a configuration example of a segment included in a programmable logic integrated circuit according to a third example embodiment.

FIG. 18 is a block diagram illustrating a configuration example of segments included in the programmable logic integrated circuit according to the third example embodiment.

As illustrated in FIG. 18, the programmable logic integrated circuit 1 of the third example embodiment is different from the first and second example embodiments in that the programmable logic integrated circuit comprises the connection switch block 223 connects the redundant column wiring (second redundant wiring) VL7 extending in the second direction and switches connection between the column wirings VL0 to VL7 and the input wirings A0 to A3.

The connection switch block 223 comprises a memory element for holding a value indicating the presence/absence of a defective switch and a fuse circuit for functioning as a switch element. Other configurations of the segments are similar to those of the first example embodiment illustrated in FIG. 5.

Figure 19:
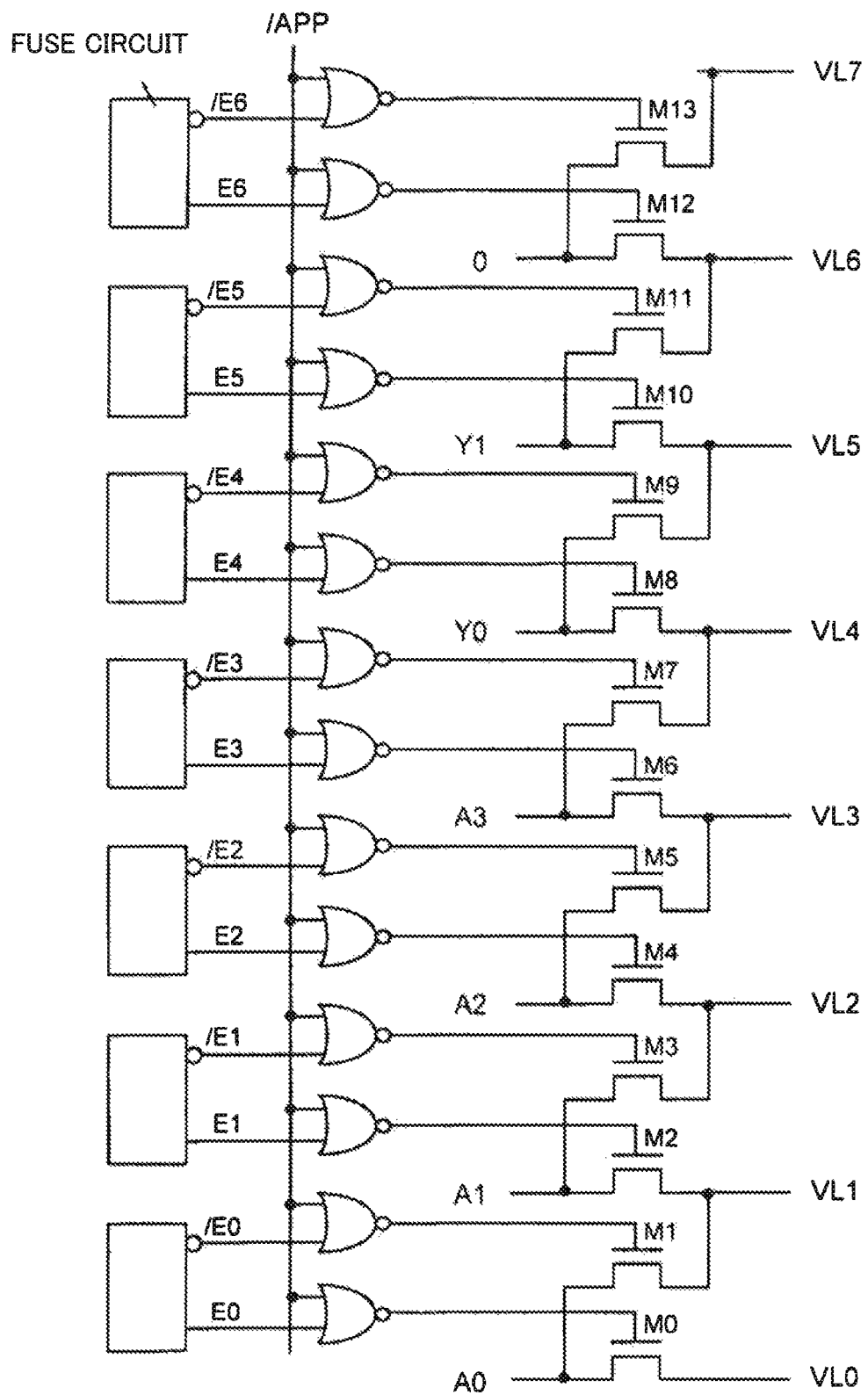
FIG. 19 is a circuit diagram illustrating a configuration example of the connection switch block illustrated in FIG. 18.

FIG. 19 is a circuit diagram illustrating a configuration example of the connection switch block illustrated in FIG. 18.

As illustrated in FIG. 19, the connection switch block 223 of the third example embodiment temporarily disconnects all the input wirings A0 to A3 and all the column wirings VL0 to VL3 temporarily in the configuration mode and read mode (/APP=1). Consequently, it is possible to avoid contention between the output voltage from the other segment and the bias voltage applied at the time of writing and reading. When a failure occurs in the switch cell 224 of the first crossbar switch block 221 and the second crossbar switch block 222, the connection switch block 223 replaces the column wiring connected to the defective switch with an adjacent column wiring. When a defective switch has not been generated in the crossbar switch block, transistors M0, M2, M4, M6, M8, M10, and M12 are set to the ON state, transistors M1, M3, M5, M7, M9, M11, and M13 are set to the OFF state, input wirings A0 to A3 are connected to column wirings VL0 to VL3, Y0 to Y1 are connected to column wirings VL4 to VL5, and the ground line 0 is connected to VL6.

On the other hand, for example, when a defective switch is generated in the switch cell 224 connected to the column wiring VL2, the transistors M0, M2, M5, M7, M9, M11, and M13 are set to the ON state, the transistors M1, M3, M4, M6, M8, M10, and M12 are set to the OFF state, column wiring VL2 is replaced with VL3, the column wiring VL3 is replaced with VL4, the column wiring VL4 is replaced with VL5, and the column wiring VL6 is replaced with VL7. In other words, the column wiring VL2 including the defective switch is not connected to any input wiring.

Connection information of the connection switch block 223 is saved in the fuse circuit illustrated in FIG. 9. The fuse circuit is provided for each column wiring, and whether or not to replace the corresponding column wiring with an adjacent column wiring is determined according to a setting value of the fuse circuit. For example, when E=0, the column wiring corresponding to the fuse circuit is not replaced with an adjacent column wiring, and when E=1, the column wiring corresponding to the fuse circuit is replaced with an adjacent column wiring.

When no failure occurs in the switch cells 224 of the first crossbar switch block 221 and the second crossbar switch block 222, all the fuse circuits E0 to E6 are set to 0.

When each column wiring is numbered in ascending order and a failure occurs in the switch cells 224 of the first crossbar switch block 221 and the second crossbar switch block 222, the fuse circuit of the column wiring to which the defective switch is connected and the fuse circuit of the column wiring which is one larger than the column wiring are set to 1. For example, when there is a defective switch in the column wiring VL, E0=0, E1=0, E2=1, E3=1, E4=1, E5=1, and E6=1.

Figure 20:
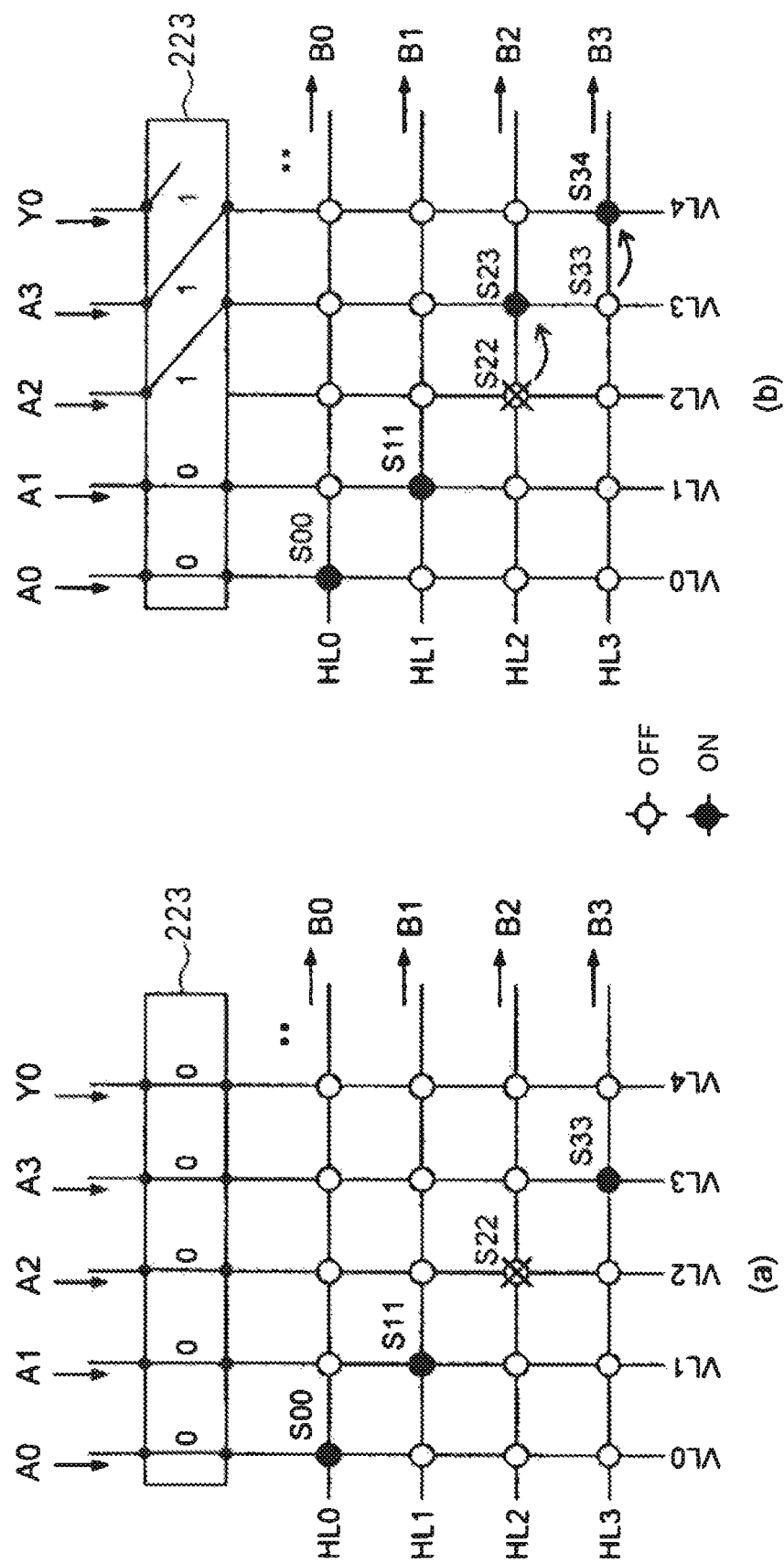
FIG. 20 is a schematic diagram illustrating an example of occurrence of a set failure (OFF-fixed) in a switch cell included in a crossbar switch block, and an example of a countermeasure method thereof.

FIG. 20 is a schematic diagram illustrating an example of a case in which a set failure (OFF-fixed) occurs in a switch cell provided in a crossbar switch block, and an example of a countermeasure method thereof.

Here, an example will be described in which the wiring A0 and the wiring B0 are connected according to the configuration information, the wiring A1 and the wiring B1 are connected, the wiring A2 and the wiring B2 are connected, and the wiring A3 and the wiring B3 are connected. In this case, the switch cells S00, S11, S22 and S33 are rewritten to the ON state, and all the other switch cells are rewritten to the OFF state. FIG. 20(a) illustrates a state in which a set failure occurs in the switch cell S22. In this case, a failure occurs in which a signal cannot be transmitted from the wiring A2 to the wiring B2.

In order to avoid the above-described malfunction, the configuration information may be changed, for example, as illustrated in FIG. 20(b) to form a detour path. In the example illustrated in FIG. 20(b), the switch cell S23 instead of the switch cell S22 is changed to the ON state and the switch cell S34 instead of the switch cell S33 is changed to the ON state. In the connection switch block 223, the wiring A2 and the column wiring VL3 are connected, the wiring A3 and the column wiring VL4 are connected, the wiring Y0 and the column wiring VL5 are connected, the fuse circuit is set in such a manner that the wiring Y1 and the column wiring VL6 are connected and the ground line 0 is connected to the column wiring VL7. In other words, the configuration information is changed to E0=0, E1=0, E2=1, E3=1, E4=1, E5=1, and E6=1. By changing the above-described configuration information, the wiring A2 and the wiring B2 are in a conductive state, and therefore, a desired signal path can be secured.

Figure 21:
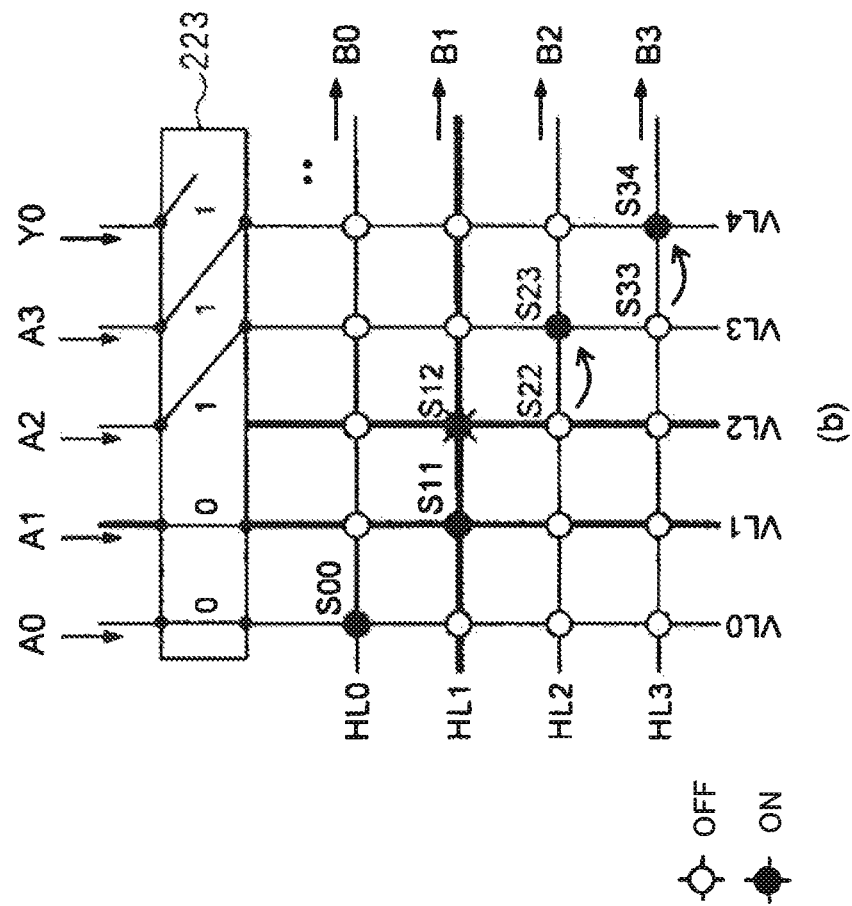
FIG. 21 is a schematic diagram illustrating an example of occurrence of a reset failure (ON-fixed) in a switch cell included in a crossbar switch block and an example of a countermeasure method thereof.
Figure 21:
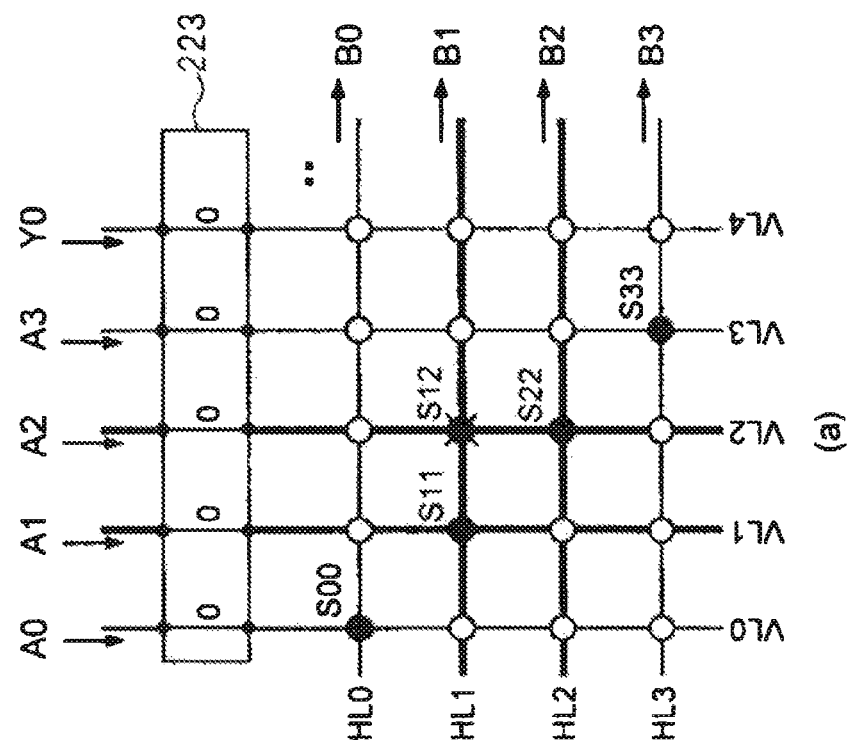

FIG. 21 is a schematic diagram illustrating an example of occurrence of a reset failure (ON-fixed) in a switch cell included in a crossbar switch block, and an example of a countermeasure method thereof. Here, as in the case of the set failure illustrated in FIG. 20, an example will be described in which the wiring A0 and the wiring B0 are connected according to the configuration information, the wiring A1 and the wiring B1 are connected, the wiring A2 and the wiring B2 are connected, and the wiring A3 and the wiring B3 are connected. In this case, the switch cells S00, S11, S22 and S33 are rewritten to the ON state, and all the other switch cells are rewritten to the OFF state. FIG. 21(a) illustrates a state in which a reset failure occurs in the switch cell S12. In this case, the four wirings VL1, HL1, VL2, and HL2 are short-circuited by the switches S11, S12, and S22 in the ON state. In other words, the wirings A1, A2, B1, and B2 are short-circuited, and a failure occurs in which signals cannot be normally transmitted from A1 to B1 and from A2 to B2.

In order to avoid the above-described malfunction, a detour path may be formed by changing the configuration information as illustrated in FIG. 21(b), for example. In the example illustrated in FIG. 21(b), the switch cell S23 instead of the switch cell S22 is changed to ON state, and the switch cell S34 instead of the switch cell S33 is changed to the ON state. In the connection switch block 223, the wiring A2 and the column wiring VL3 are connected, the wiring A3 and the column wiring VL4 are connected, the wiring Y0 and the column wiring VL5 are connected, a fuse circuit is set in such a manner that the wiring Y1 and the column wiring VL6 are connected and the ground line 0 is connected to the column wiring VL7. In other words, the configuration information is changed to E0=0, E1=0, E2=1, E3=1, E4=1, E5=1, and E6=1.

When such changes are made, short-circuiting between the column wirings VL1 and VL2 is not eliminated, but the column wirings VL2 are disconnected from the input wiring A2, and therefore, the above-described malfunction can be avoided. Therefore, the input wiring A1 and the output wiring B1, the input wiring A2 and the output wiring B2 are brought into a conductive state, and a desired signal path can be secured.

According to the third example embodiment, similarly to the second example embodiment, it is possible to maintain the connection relation between the input wiring and the output wiring in one segment without changing the connection. This means that there is no need to change the configuration information of other segments, and therefore, there is an advantage that only the configuration information of the segment in which a failure has occurred needs to be changed.

Fourth Example Embodiment

Figure 22:
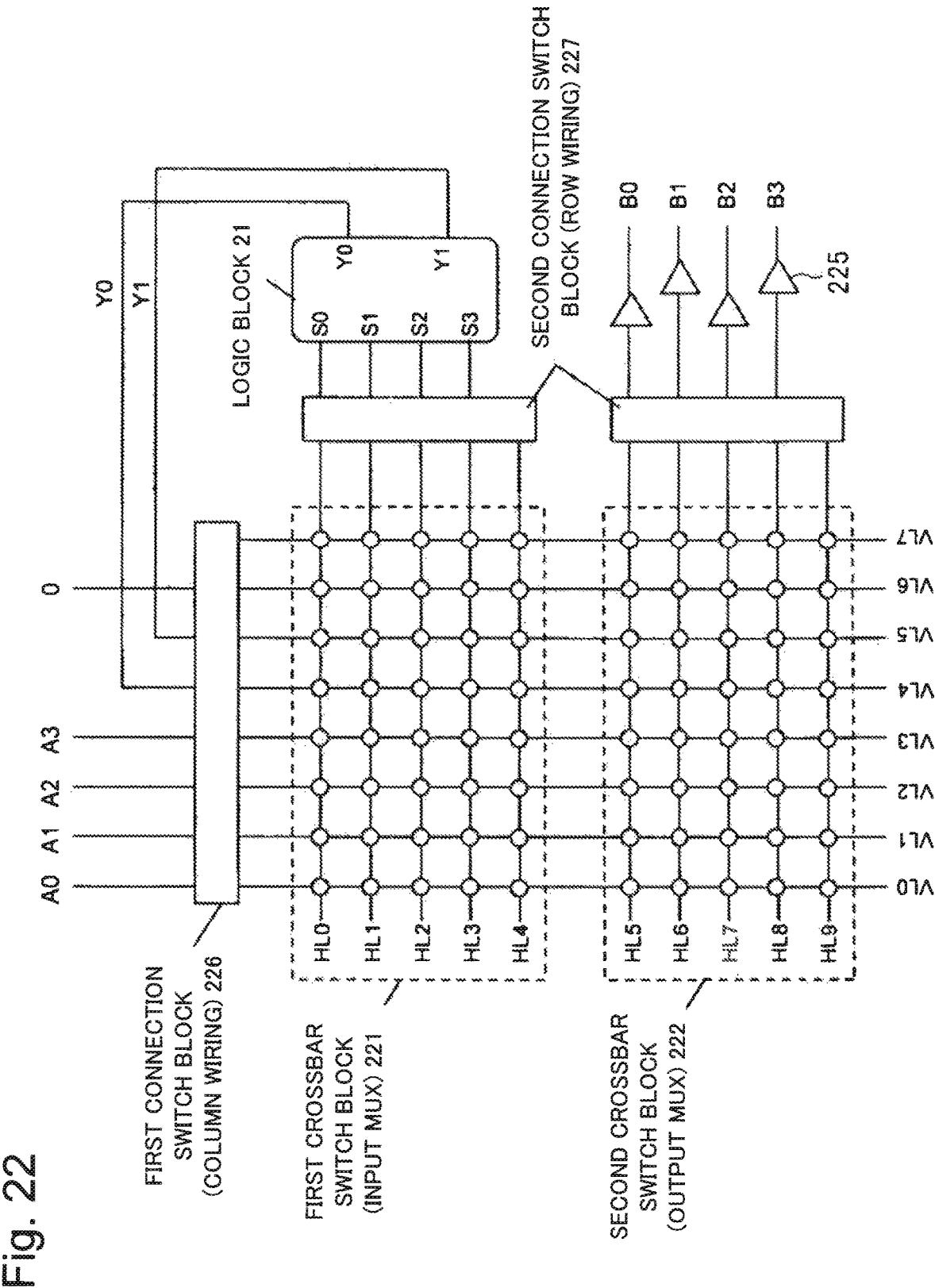
FIG. 22 is a block diagram illustrating a configuration example of a segment included in a programmable logic integrated circuit of a fourth example embodiment.

FIG. 22 is a block diagram illustrating a configuration example of segments included in the programmable logic integrated circuit according to the fourth example embodiment.

As illustrated in FIG. 22, similarly to the second example embodiment, the programmable logic integrated circuit 1 of the fourth example embodiment comprises: a first connection switch block 226 for connecting or disconnecting the input wirings A0 to A3, the output wirings Y0 to Y1, and the ground line and the column wirings VL0 to VL6; and a second connection switch block 227 for connecting or disconnecting the row wirings HL0 to HL9 and the input terminal of the logic block 21 and the input terminal of the output buffer. The first crossbar switch block 221 comprises a redundant row wiring (first redundant wiring) HL4, and the second crossbar switch block 222 comprises a redundant row wiring (first redundant wiring) HL9. Further, similarly to the third example embodiment, the programmable logic integrated circuit 1 of the fourth example embodiment is configured such that a connection switch block (first connection switch block 226) comprises a redundant column wiring (second redundant wiring) VL7, and the connection between column wirings VL0 to VL7 and input wires A0 to A3 can be switched.

The first connection switch block 226 comprises a first memory element that holds a value indicating the presence/absence of a defective switch and a fuse circuit for functioning as a first switch element. The second connection switch block 227 comprises a second memory element for holding a value indicating the presence/absence of a defective switch and a fuse circuit for functioning as a second switch element. Other configurations of the segments are similar to those of the first example embodiment illustrated in FIG. 5.

The first crossbar switch block 221 temporarily connects or disconnects the input wirings A0 to A3, the output wirings Y0 to Y1 and the ground line and the column wirings VL0 to VL6 in the configuration mode and the read mode (/APP=1). When a defective switch is generated in the first crossbar switch block 221 and the second crossbar switch block 222, the first connection switch block 226 replaces a column wiring connected to the defective switch with an adjacent column wiring.

The first connection switch block 226 of the present example embodiment has a similar configuration to the connection switch block 223 of the third example embodiment illustrated in FIG. 19. A method of replacing the column wiring including the defective switch is similar to the third example embodiment.

When a defective switch is generated in the first crossbar switch block 221 and the second crossbar switch block 222, the second connection switch block 227 replaces the row wiring to which the defective switch is connected with an adjacent row wiring.

The second connection switch block 227 of the present example embodiment has a similar configuration to the connection switch block 223 of the second example embodiment illustrated in FIG. 15. The method of replacing the row wiring including the defective switch is also similar to the second example embodiment.

Figure 23:
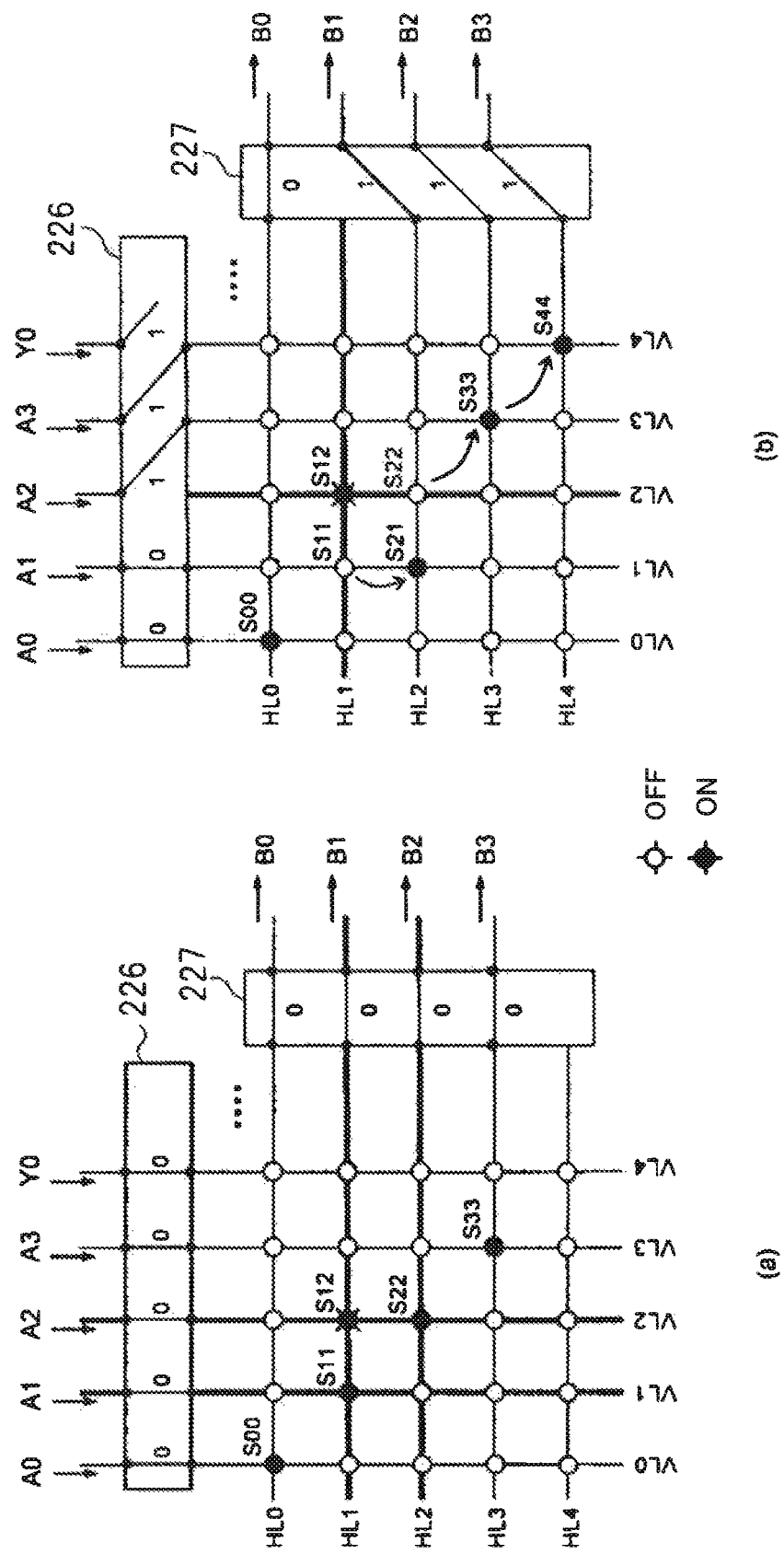
FIG. 23 is a schematic diagram illustrating an example of occurrence of a reset failure (ON-fixed) in a switch cell included in a crossbar switch block and an example of a countermeasure method thereof.

FIG. 23 is a schematic diagram illustrating an example of occurrence of a reset failure (ON-fixed) in the switch cell provided in a crossbar switch block, and an example of a countermeasure method thereof. Here, an example will be described in which the wiring A0 and the wiring B0 are connected according to the configuration information, the wiring A1 and the wiring B1 are connected, the wiring A2 and the wiring B2 are connected, and the wiring A3 and the wiring B3 are connected. In this case, the switch cells S00, S11, S22, and S33 are rewritten to the ON state, and all the other switch cells are rewritten to the OFF state. FIG. 23(a) illustrates a state in which a reset failure occurs in the switch cell S12. In this case, the four wirings VL1, HL1, VL2, and HL2 are short-circuited by the switches S11, S12, and S22 in the ON state. In other words, the wirings A1, A2, B1, and B2 are short-circuited, and a failure occurs in which signals cannot be normally transmitted from A1 to B1 and from A2 to B2.

In order to avoid the above-described malfunction, the configuration information of the row wiring to which the defective switch is connected and the row wiring having a larger row number than the row wiring is copied to an adjacent row wiring. Further, the configuration information of the column wiring to which the defective switch is connected and the column wiring having the column number larger than the column wiring is copied to an adjacent column wiring. In other words, the detour path may be formed by changing the configuration information as illustrated in FIG. 23(b), for example. In the example illustrated in FIG. 23(b), the switch cell S21 instead of the switch cell S11 is changed to the ON state, the switch cell S33 instead of the switch cell S22 is changed to the ON state, and the switch cell S44 instead of the switch cell S33 is changed to the ON state. In the first connection switch block 226, a fuse circuit is set in such a manner that the input wiring A0 and the column wiring VL0 are connected, the input wiring A1 and the column wiring VL1 are connected, the input wiring A2 and the column wiring VL3 are connected, the input wiring A3 and the column wiring VL4 are connected, the wiring Y0 and the column wiring VL5 are connected, the wiring Y1 and the column wiring VL6 are connected, and the ground line 0 and the column wiring VL7 are connected. Further, in the second connection switch block 227, a fuse circuit is set in such a manner that the row wiring HL0 and the output wiring B0 are connected, the row wiring HL2 and the output wiring B1 are connected, the row wiring HL3 and the output wiring B2 are connected, and the row wiring HL4 and the output wiring B3 are connected.

By changing the configuration information as described above, the column wiring VL2 including a defective switch is disconnected from the input wiring A2, and the row wiring HL1 including the defective switch is disconnected from the output wiring B1. Therefore, a signal path of the wiring B1 is formed from the wiring A1 by a detour path via the row wiring HL2, a signal path of the wiring B2 is formed from the wiring A2 by a detour path via the column wiring VL3 and the row wiring HL3, and a signal path of the wiring B3 from the wiring A3 is formed by a detour path via the column wiring VL4 and the row wiring HL4, and the above-described malfunction is eliminated.

In the first to third example embodiments described above, since the switch cell 224 in which a reset failure (ON-fixed) occurred is always on, there is a possibility that a signal path increasing the wiring load may be generated. This is undesirable because such a signal path causes a signal delay of the programmable logic integrated circuit and power consumption to increase.

In the fourth example embodiment, a row wiring and a column wiring connected to the switch cell 224 in which a reset failure has occurred are completely separated from the input/output wiring. Therefore, a signal delay of the programmable logic integrated circuit and increase in power consumption are suppressed.

Note that, although an explanation is omitted in the fourth example embodiment, when a set failure (OFF-fixed) occurs, the countermeasure method described in the second and third example embodiments can be applied. For example, when a set failure occurs, the setting of the fuse circuit of the second connection switch block 227 may be changed in such a manner that a row wiring including a switch cell in which a set failure has occurred is replaced with an adjacent row wiring. Alternatively, the setting of the fuse circuit of the first connection switch block 226 may be changed in such a manner that a column wiring including a switch cell in which a set failure has occurred may be replaced with an adjacent column wiring.

The programmable logic integrated circuit 1 of the present invention is not limited to the first to fourth example embodiments described above and may be appropriately changed within the scope of the technical idea of the present invention.

For example, a variable resistance element may hold a low resistance state and a high resistance state even when a power supply voltage is not supplied, and as the variable resistance element, a solid electrolyte resistance element, a metal oxide resistance element, a phase change resistance element, a magneto-resistive element or the like may be used.

In the logic block 21 illustrated in FIG. 10, a crossbar switch block of an LUT circuit comprises a redundant wiring and a redundant switch cell and a connection switch block, and when a defective switch is generated, a wiring to which the defective switch is connected may be replaced with a redundant wiring.

Further, in the connection switch blocks illustrated in FIG. 8, FIG. 15, and FIG. 19, a variable resistance element may be used instead of a transistor used as switching means for switching the connection between the input/output wiring and the matrix wiring.

Fifth Example Embodiment

In the fifth example embodiment, a design support system that supports design of configuration information needed for forming a circuit to be mounted on the programmable logic integrated circuit 1 described in the first to fourth example embodiments will be described.

Figure 24:
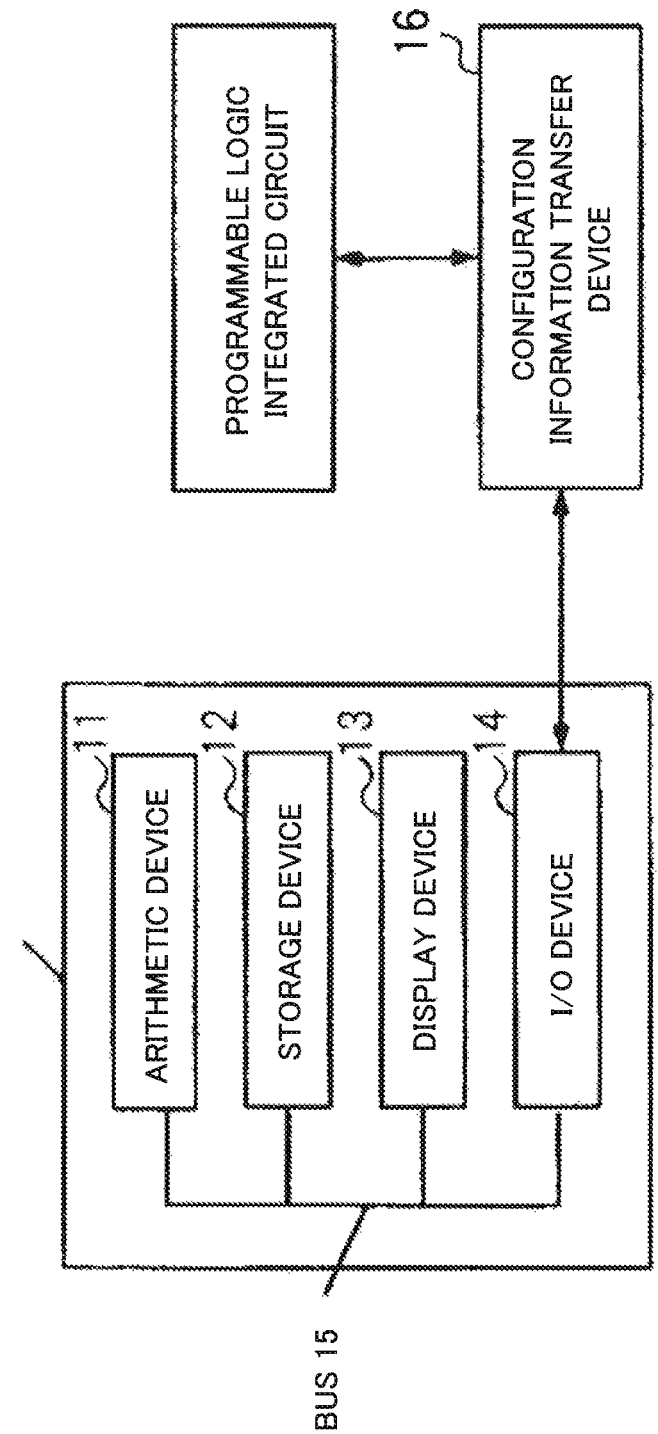
FIG. 24 is a block diagram illustrating a configuration example of a design support system of the present invention.

FIG. 24 is a block diagram illustrating one configuration example of the design support system of the present invention.

As illustrated in FIG. 24, a design support system 10 is configured in such a manner that an arithmetic device 11, a storage device 12, a display device 13, and an I/O device 14, and the arithmetic device 11, the storage device 12, the display device 13, and the I/O device 14 are connected to each other via a bus 15. The design support system 10 is realized by, for example, a computer system. To the design support system 10, the configuration information transfer device 16 and the programmable logic integrated circuit 1 are communicably connected using a well-known communication means by wire or wireless. The programmable logic integrated circuit 1 and the configuration information transfer device 16 may be mounted on the design support system 10 as an application board.

The arithmetic device 11 controls the overall operation of the design support system 10 by executing processing in accordance with a program stored in advance in the storage device 12. Further, the arithmetic device 11 realizes a function of a design support tool group 100 described below by executing processing in accordance with a program stored in advance in the storage device 12.

The storage device 12 stores design information and programs. Examples of the design information include operation description information and constraint condition information of a circuit created by a designer mounted on the programmable logic integrated circuit 1. Examples of the design information include: netlist information, place and route information, and a delay power analysis result, which are processing results of an arithmetic device 11 described below; and resource information, configuration information, and rewrite history information of the programmable logic integrated circuit 1.

The display device 13 displays an instruction input screen of the design support tool or a processing result by the design support tool.

The I/O device 14 is an interface circuit that transmits and receives a signal and data to and from an input device such as a keyboard and a mouse, and an output device such as a configuration information transfer device 16 and a printing device.

The configuration information transfer device 16 is connected to the design support system 10 and the programmable logic integrated circuit 1 and controls data transmission such as configuration information between the design support system 10 and the programmable logic integrated circuit 1. For example, the configuration information transfer device receives data such as configuration information transmitted from the design support system 10, converts the data into transmission data of data input/output specification of the programmable logic integrated circuit 1, and transfers the transmission data. The configuration information transfer device receives configuration data and other data output from the programmable logic integrated circuit 1, converts the data into transmission data of the data input/output specification of the design support system 10, and transfers the transmission data.

Figure 25:
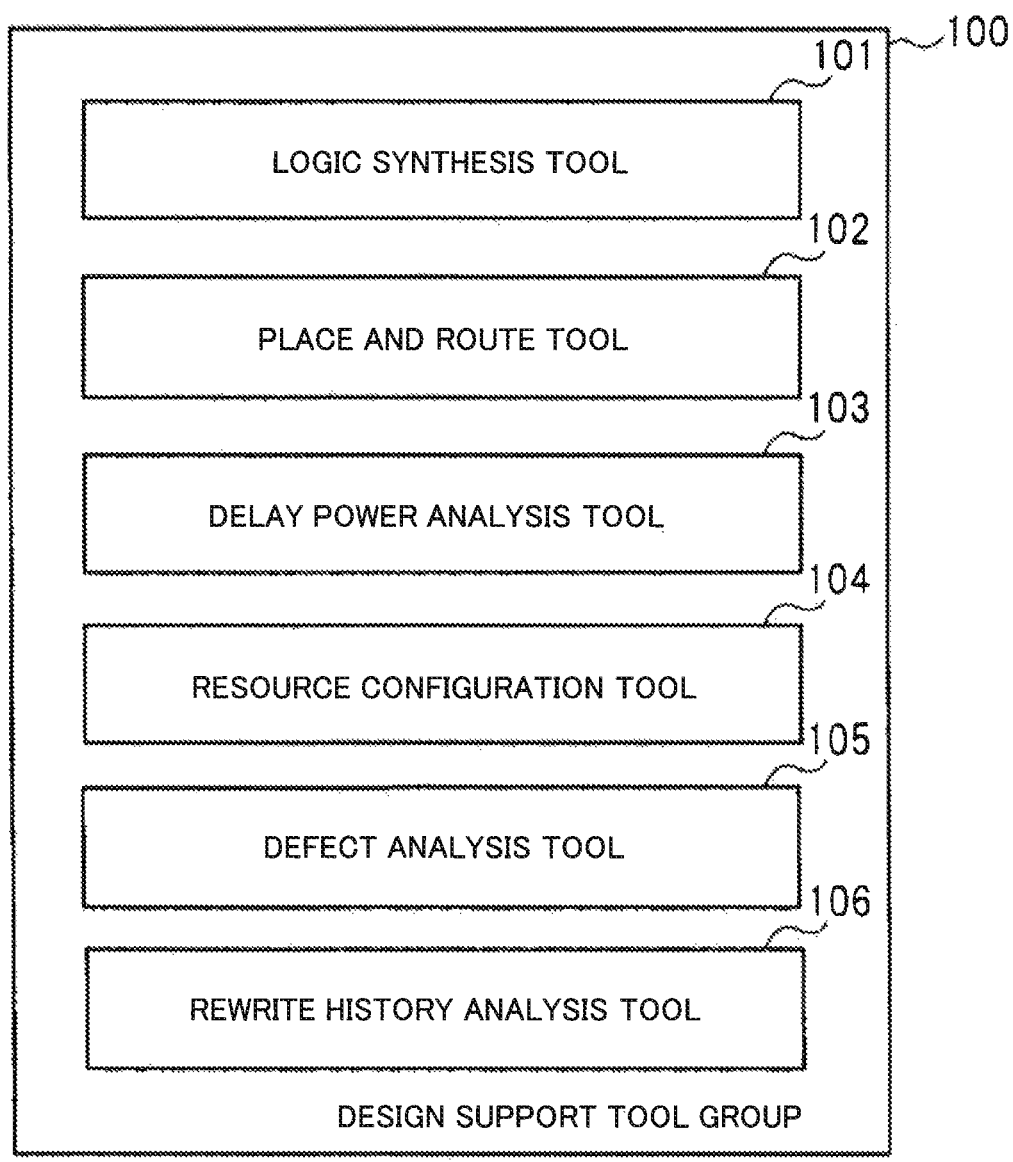
FIG. 25 is a block diagram illustrating a configuration example of a design support tool group included in the design support system illustrated in FIG. 24.

FIG. 25 is a block diagram illustrating a configuration example of a design support tool group provided in the design support system illustrated in FIG. 24.

As illustrated in FIG. 25, the design support tool group 100 includes a logic synthesis tool 101, a place and route tool 102, a delay power analysis tool 103, a resource configuration tool 104, a defect analysis tool 105, and a rewrite history analysis tool 106.

The place and route tool 102 and the delay power analysis tool 103 are examples of configuration information generating means included in the design support system of the present invention and the resource setting tool 104 is an example of resource setting means included in the design support system of the present invention. The defect analysis tool 105 is an example of defect information generating means included in the design support system of the present invention and the rewrite history analysis tool 106 is an example of rewrite history information generating means included in the design support system of the present invention.

The logic synthesis tool 101 performs logic synthesis by referring to operation description information and constraint condition information such as delay or power inputted by a designer. A designer can obtain a netlist by this tool. The netlist is connection information of each element circuit included in the programmable logic integrated circuit 1.

The place and route tool 102 pseudo-arranges and wires element circuits included in the programmable logic integrated circuit 1 included in a netlist based on resource information of the programmable logic integrated circuit 1. A designer can obtain the configuration information with this tool.

The delay power analysis tool 103 calculates the analysis of the maximum delay time of a circuit created by a designer and the power consumption by referring to the configuration information. With this tool, a designer can know the value of the operating frequency and the power consumption when a needed circuit is implemented on the programmable logic integrated circuit 1.

The resource configuration tool 104 creates device-specific resource information based on the configuration information received from the programmable logic integrated circuit 1. The resource information is information indicating circuit elements available in a circuit implemented on the programmable logic integrated circuit 1, and examples of the resource information include address information of a variable resistance element included in an element circuit or a switch block included in the programmable logic integrated circuit 1 and information indicating the presence or absence of a defect (failure) of the variable resistance element.

The defect analysis tool 105 compares the configuration information generated by the place and route tool 102 with the configuration information received from the programmable logic integrated circuit 1, and creates information (defect information) indicating the presence or absence of a defect (failure) in the programmable logic integrated circuit 1 to be implemented by a designer.

The rewrite history analysis tool 106 creates device specific rewrite history information based on the configuration information (internal configuration information) read from the programmable logic integrated circuit 1. The rewrite history information includes address information of a variable resistance element included in an element circuit or a switch block included in the programmable logic integrated circuit 1 and information on rewrite frequency.

Figure 26:
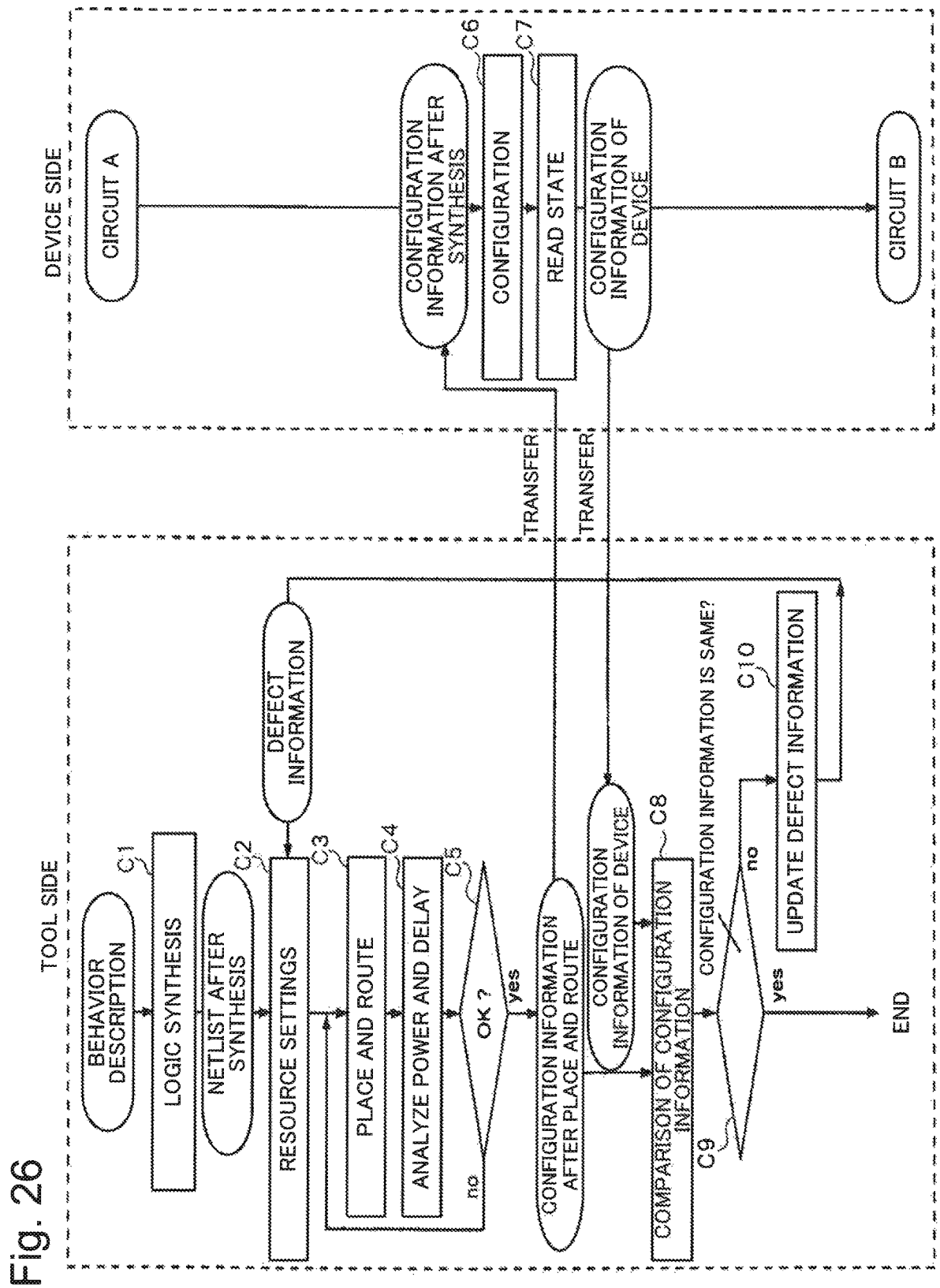
FIG. 26 is a flowchart illustrating an example of a logical design procedure using the design support system of the present invention.

FIG. 26 is a flowchart illustrating an example of a logical design procedure using the design support system of the present invention. FIG. 26 illustrates an example of a processing procedure in a case in which a circuit B different from a circuit A is implemented in the programmable logic integrated circuit 1 in which the circuit A is implemented.

As illustrated in FIG. 26, an operation description file of a circuit B created by a designer using a hardware description language (for example, Verilog-HDL, VHDL or the like) is inputted to the design support system 10.

The design support system 10 logically synthesizes an operation description file using the logic synthesis tool 101 (step CO, and creates a netlist of the circuit B. The netlist is created using an LUT, a DFF or the like which is an element circuit of the logic block 21 of the programmable logic integrated circuit 1. The netlist also includes truth value information of each LUT. The logic synthesis tool 101 optimizes the circuit in such a manner to satisfy timing constraint information set in advance by a designer.

When the netlist is created by the logic synthesis tool 101, the design support system 10 executes resource setting based on defect information using the resource configuration tool 104 according to an instruction of a designer (step C2). The defect information is device-specific information, and is information that is created in advance by a method described below. The resource configuration needs to be executed every time a device (programmable logic integrated circuit 1) that performs the configuration is changed.

Figure 27:
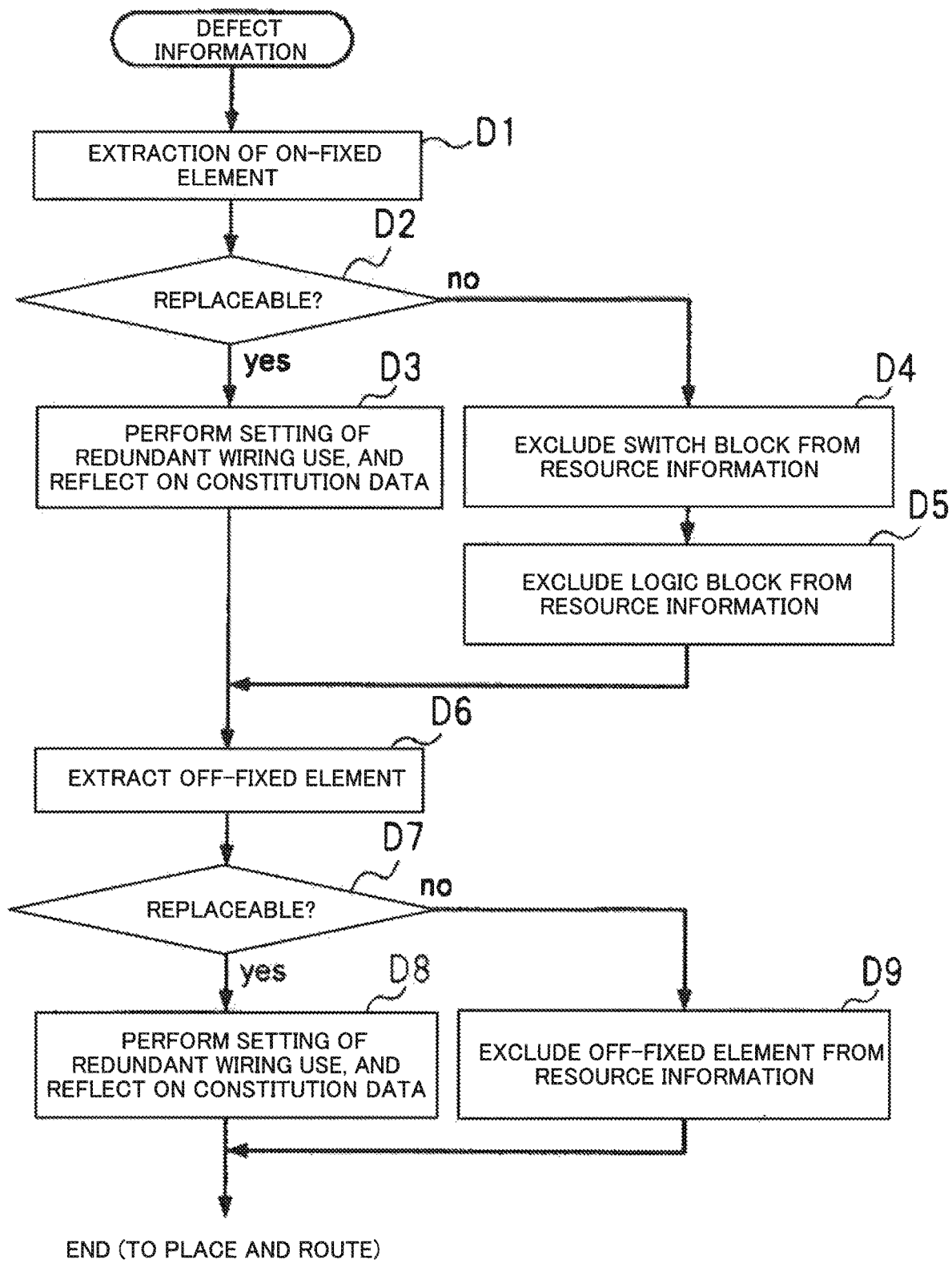
FIG. 27 is a flowchart illustrating an example of a processing procedure of resource setting illustrated in FIG. 26.

FIG. 27 is a flowchart illustrating an example of the processing procedure of resource configuration illustrated in FIG. 26.

As illustrated in FIG. 27, the resource configuration tool 104 first extracts an ON-fixed defective element (an element in which a reset failure occurred or a defect element fixed in an ON state) based on defect information (step D1) and checks whether or not the defective element is replaceable (step D2). The replaceable state means a state in which a condition that a defective element does not exist and a redundant wiring is not used in a crossbar switch block where the defective element exists is satisfied. In a replaceable case, a wiring including a defective element is replaced with an adjacent wiring and the setting value of the fuse circuit of the connection switch block is determined in such a manner to utilize a redundant wiring (step D3). This setting value is a value written in a variable resistance element of a fuse circuit and is included in the configuration information. In an un-replaceable case, a crossbar switch block including a defective element and the logic block 21 inputted via the switch block are deleted from the resource information (steps D4 and D5), and the logic block 21 is not used in a place and route process described below.

Next, the resource configuration tool 104 extracts an OFF-fixed element (an element in which a set failure has occurred or a defect element fixed in OFF state) from the defect information (step D6) and checks whether or not the defective element is replaceable (step D7). In a replaceable case, a wiring including a defective element is replaced with an adjacent wiring and a setting value of a fuse circuit of a connection switch block is determined in such a manner to utilize a redundant wiring (step D8). In an un-replaceable case, a switch cell of the defective element is deleted from the resource information, and the switch cell is set not to be utilized in a place and route process described below (step D9).

When a netlist and resource information are created, the design support system 10 executes a place and route process of the circuit B implemented on the programmable logic integrated circuit 1 by using the place and route tool 102 (step C3), and creates the configuration information instructed by a designer. In the place and route process, the place and route tool 102 determines how to physically arrange element circuits described in the netlist in the programmable logic integrated circuit 1. The place and route tool 102 determines how to wire and connect each physically arranged element circuit using a wiring switch based on the connection information of the element circuit described in the netlist. At this time, the place and route tool 102 optimally selects element circuits and wiring switches to be used in such a manner to minimize circuit delay. Further, the place and route tool 102 refers to the resource information, and when the element circuit and wiring switch are unusable, the tool makes a change to use other element circuit and wiring switch.

The processing by the place and route tool 102 will be described with reference to FIGS. 28 and 29.

Figure 28:
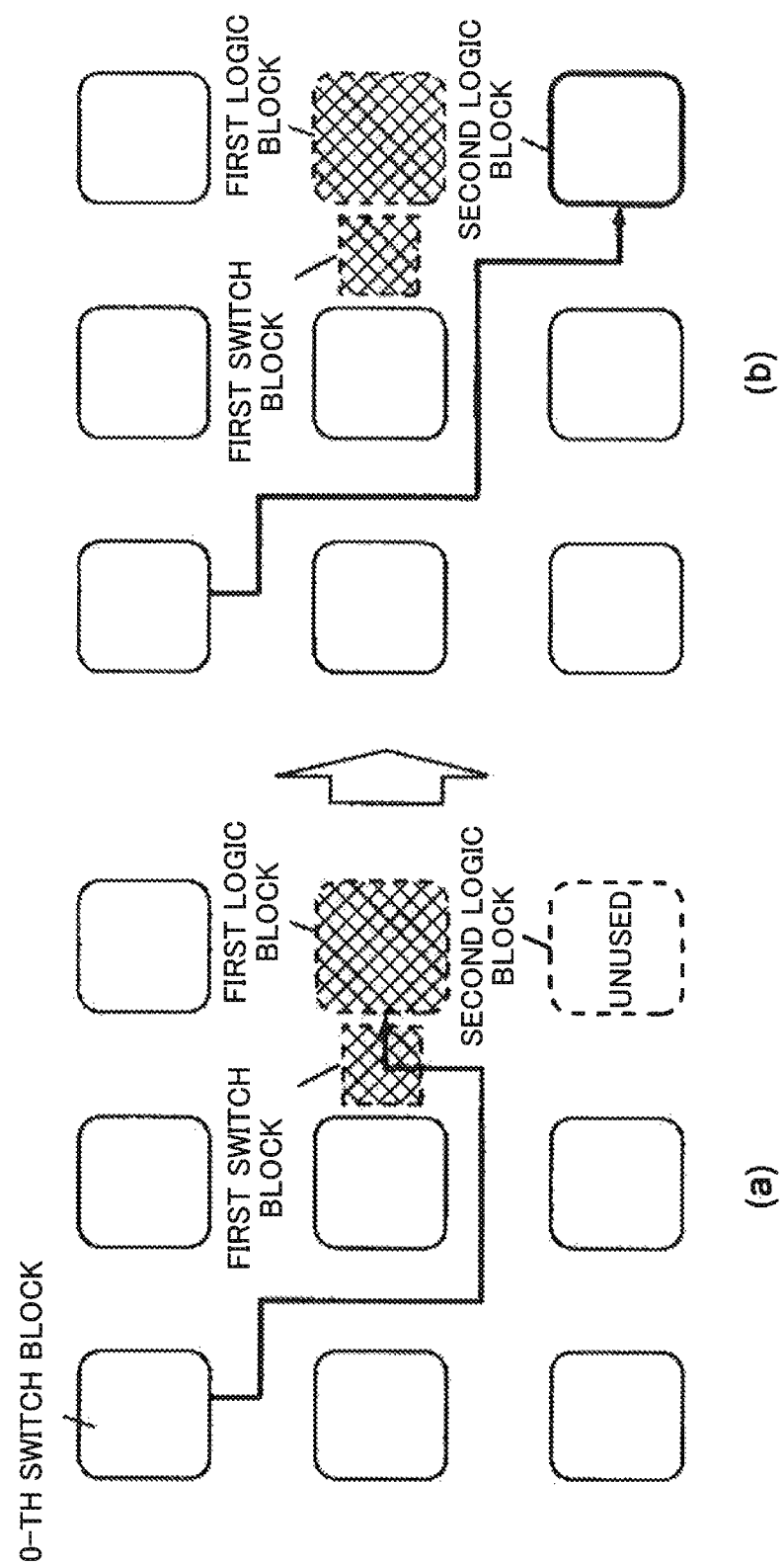
FIG. 28 is a schematic diagram illustrating an example of processing by a place and route tool when resource information includes a switch block and a logic block that are not available.

FIG. 28 is a schematic diagram illustrating an example of processing by the place and route tool 102 in a case in which a switch block and a logic block that cannot be used for resource information are included.

In the example illustrated in FIG. 28, it is assumed that the first switch block includes an ON-fixed defective switch and it is determined that replacement cannot be made with a redundant wiring by the resource configuration tool 104, and the first switch block is determined to be unusable. The first logic block is assumed to be unusable because its input/output wiring is connected to the first switch block.

FIG. 28(a) illustrates a state in which the place and route tool 102 selects a signal path from the 0-th logic block to the first logic block as a candidate for a signal path with the minimum circuit delay. Here, since the first switch block and the first logic block are unusable resources as described above, the place and route tool 102 executes a process of searching a detour path.

The place and route tool 102 detects, for example, that the second logic block is an unused resource and performs processing for replacing the signal path from the 0th logic block to the 2nd logic block. Finally, wiring is performed as illustrated in FIG. 28(b), and it is determined that this signal path is the best, and the configuration information is determined.

Figure 29:
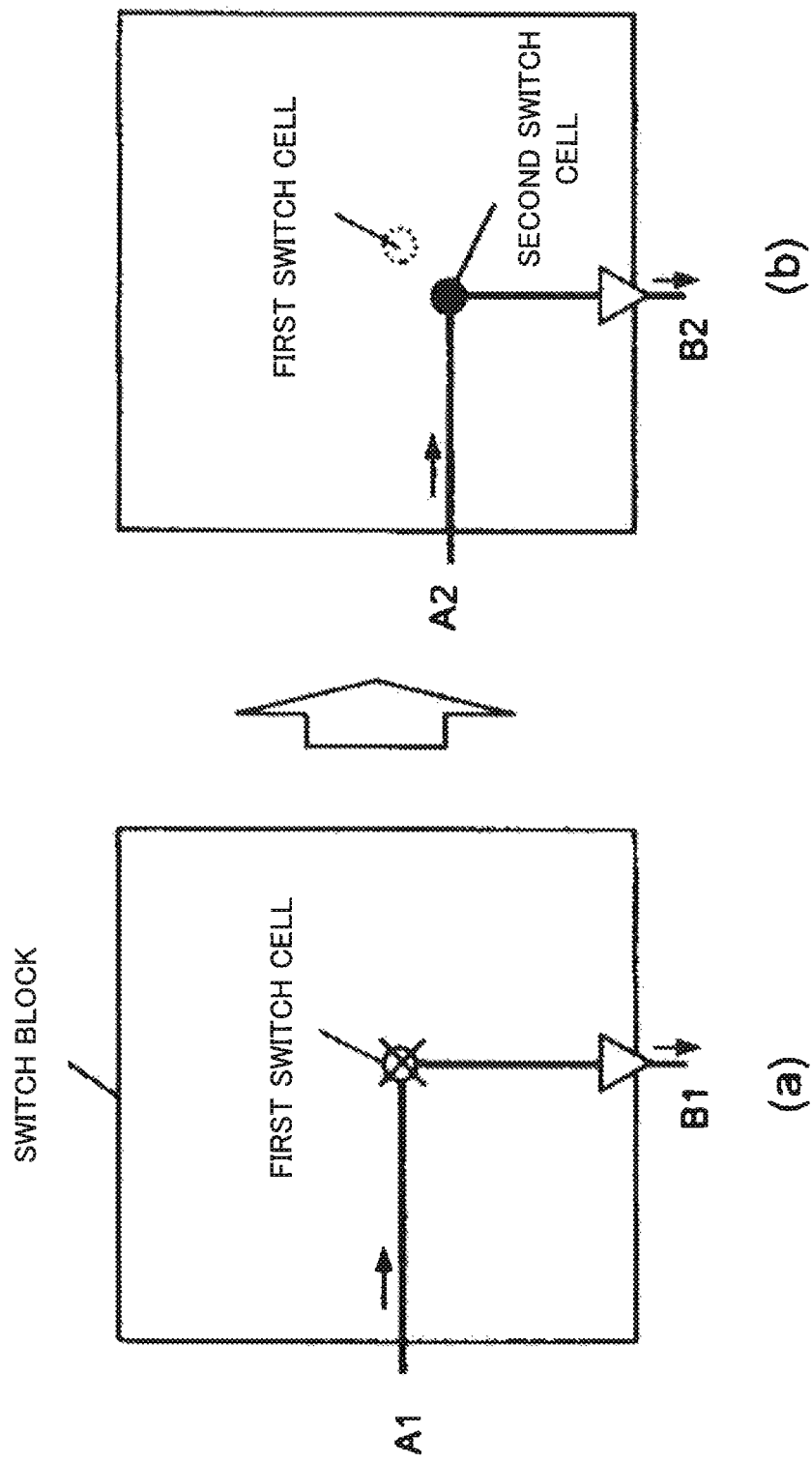
FIG. 29 is a schematic diagram illustrating an example of processing by the placement and routing tool when the switch information includes unavailable switch cells as resource information.

FIG. 29 is a schematic diagram illustrating an example of processing by the place and route tool in a case in which the resource information includes a switch cell that is unusable.

In the example illustrated in FIG. 29, it is assumed that the first switch cell is a defective switch which is OFF-fixed, it is judged not to be replaced with a redundant wiring by the resource setting tool 104, and the first switch cell is registered on resource information as a switch cell which is not usable.

FIG. 29(a) illustrates that the place and route tool 102 has selected a signal path from the wiring A1 to the wiring B1 by turning on the first switch cell as a candidate for a signal path with the minimum circuit delay. Here, since the first switch cell is a resource that cannot be used as described above, the place and route tool 102 executes a process of searching a detour path.

The place and route tool 102 detects, for example, unused input wiring A2 and unused output wiring B2, sets the second switch cell in the ON state, and performs processing for replacing the signal path from the wiring A2 to B2. Finally, wiring is performed as illustrated in FIG. 29(b), and it is determined that this signal path is the best, and the configuration information is determined.

When configuration information is determined by the place and route tool 102, the design support system 10 returns to the processing procedure illustrated in FIG. 26 and analyzes the delay and the power of the circuit based on the configuration information using the delay power analysis tool 103 according to an instruction by a designer (step C4). Then, it is determined whether or not the delay and power constraint conditions set in advance by the designer are satisfied (step C5), and when the constraint condition is satisfied, the configuration information becomes the final result. When the constraint condition is not satisfied, the process returns to the process of step C3 and the place and route process is repeatedly executed until the constraint condition is satisfied.

When the configuration information of the circuit B is finally determined, the configuration information transfer device 16 is connected to the design support system 10 and the programmable logic integrated circuit 1 by a designer, and a communication path between the design support system 10 and the programmable logic integrated circuit 1 is established. The determined configuration information of the circuit B is transmitted to the programmable logic integrated circuit 1 via the configuration information transfer device 16. Upon receiving the configuration information from the configuration information transfer device, the programmable logic integrated circuit 1 starts the configuration operation according to the processing procedure illustrated in FIG. 6 (step C6). When configuration of all the configuration information is completed, the circuit B is implemented on the programmable logic integrated circuit 1.

When the circuit B is implemented on the programmable logic integrated circuit 1, the design support system 10 verifies the configuration information written in the programmable logic integrated circuit 1 using the defect analysis tool 105 according to an instruction by a designer.

The defect analysis tool 105 instructs the programmable logic integrated circuit 1 to read the states of all the switch cells, and the programmable logic integrated circuit 1 reads the states of all the switch cells according to the instruction (step C7). Then, the configuration information (internal configuration information) indicating the state of the read switch cell is transmitted to the design support system 10 via the configuration information transfer device 16.

When the design support system 10 receives internal configuration information read from the programmable logic integrated circuit 1, the design support system 10 uses the defect analysis tool 105, compares the configuration information after placement and routing with the configuration information (internal configuration information) read from the programmable logic integrated circuit 1 (step C8), and judges whether or not both are the same (step C9). When both are the same, the configuration work for the programmable logic integrated circuit 1 is completed. When the configuration information after the placement and routing differs from the configuration information read from the programmable logic integrated circuit 1, the defect analysis tool 105 determines that a defect including a write failure has occurred. Then, the defect analysis tool 105 analyzes whether a switch cell corresponding to a defective portion where a write failure has occurred is ON-fixed or OFF-fixed, and updates the defect information by additionally recording the address of the switch cell and the analysis result (ON-fixed or OFF-fixed) to the defect information (step C10).

When the defect information is updated, the design support system returns to the process of step C2 in FIG. 26, executes the resource setting again by the resource setting tool 104, and regenerates the configuration information by the place and route tool 102 again.

When re-creating the configuration information, the place and route tool 102 focuses on an unavailable resource newly added to the resource information, and corrects the configuration information only for the part related to the resource. The re-created configuration information is transmitted to the programmable logic integrated circuit 1 and configuration is executed. At this time, most of the re-created configuration information has already been written in the programmable logic integrated circuit 1.

Therefore, according to the processing procedure illustrated in FIG. 6, it is possible to omit the rewriting operation of many switch cells (variable resistance elements) provided in the programmable logic integrated circuit 1.

When configuration of re-created configuration information for the programmable logic integrated circuit 1 is completed, the design support system 10 verifies the configuration information written in the programmable logic integrated circuit 1 again using the defect analysis tool 105 according to an instruction by a designer. When the re-created configuration information matches the configuration information read out from the programmable logic integrated circuit 1, since the circuit B is correctly implemented in the programmable logic integrated circuit 1, a series of configuration operations is completed.

Note that, in the configuration of the configuration information for the programmable logic integrated circuit 1, when the rewrite operation can be prevented from concentrating on a specific variable resistance element, the reliability of the programmable logic integrated circuit 1 is improved, which is preferable.

Figure 30:
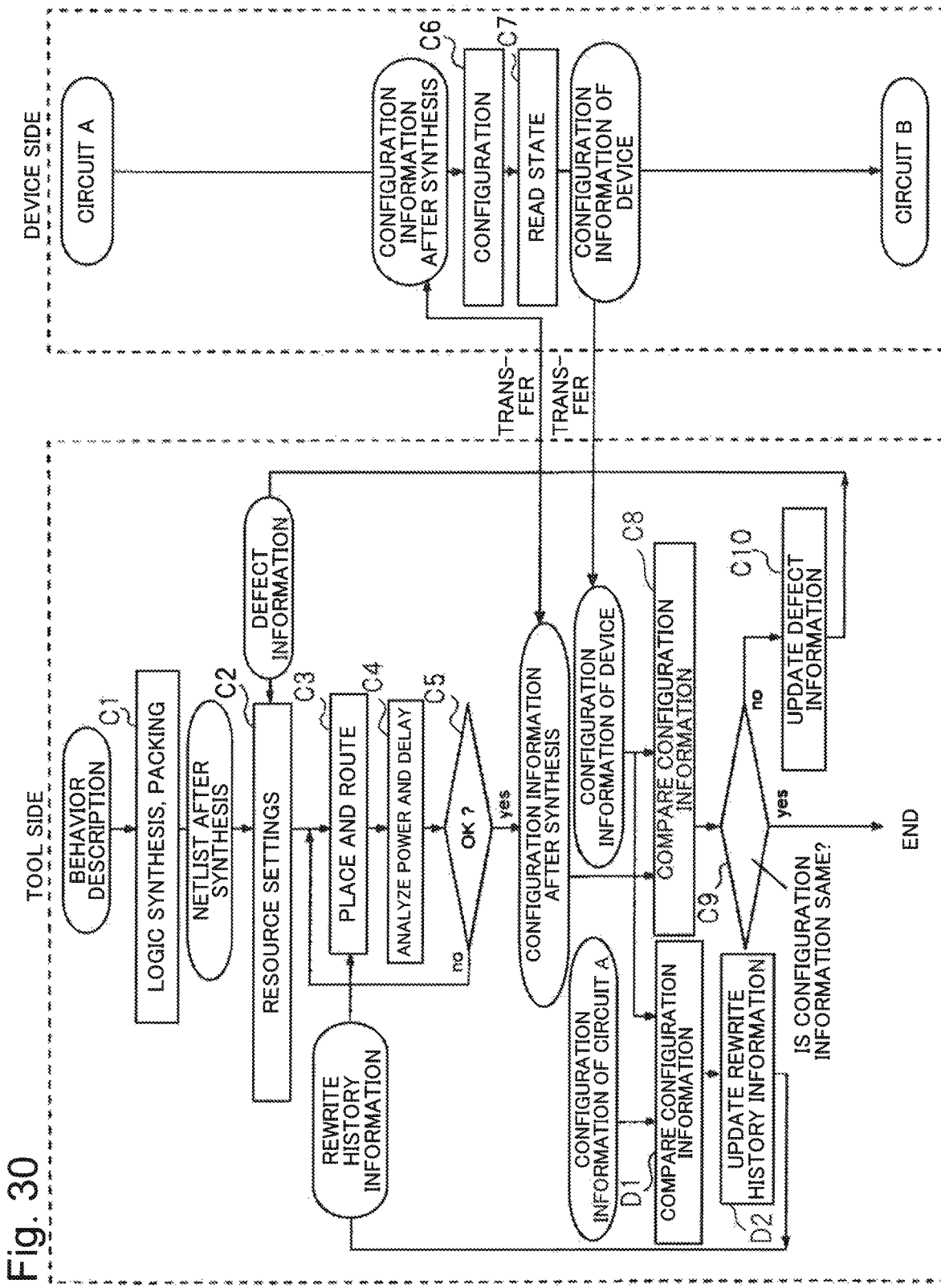
FIG. 30 is a flowchart illustrating a processing procedure when configuration information of a programmable logic integrated circuit is configured using resource information including defect information and rewrite history information.

FIG. 30 is a flowchart illustrating a processing procedure in a case of executing configuration of configuration information for a programmable logic integrated circuit using resource information including defect information and rewrite history information. The rewrite history information includes an address of each variable resistance element included in the programmable logic integrated circuit 1 and information indicating the number of times of rewriting the state of each variable resistance element.

FIG. 30 illustrates an example of processing in a case in which the programmable logic integrated circuit 1 in which the configuration information of the circuit B is written is rewritten to the configuration information of the circuit A different from the circuit B.

In the processing illustrated in FIG. 30, the placement and routing tool 102 determines how to arrange each element circuit and which wiring switch is used to connect the element circuit, with reference to a netlist, resource information in which defect information is reflected, and rewrite history information. At this time, the element circuit and the wiring switch to be used execute the placement and routing processing in which priority is given to avoidance of unusable element circuit and wiring switch in an optimization policy that minimizes circuit delay and priority is given to a switch cell having a variable resistance element with a small number of rewrite operations.

The rewrite history analysis tool 106 compares the configuration information (circuit B) read from the programmable logic integrated circuit 1 with the configuration information of the circuit A (step D1) and updates the rewrite history information by taking the difference (step D2). Since the other processes are similar to the processes illustrated in FIG. 26, the description thereof will be omitted here.

Next, a process of determining a signal path considering rewrite history information will be described with reference to FIG. 31.

Figure 31:
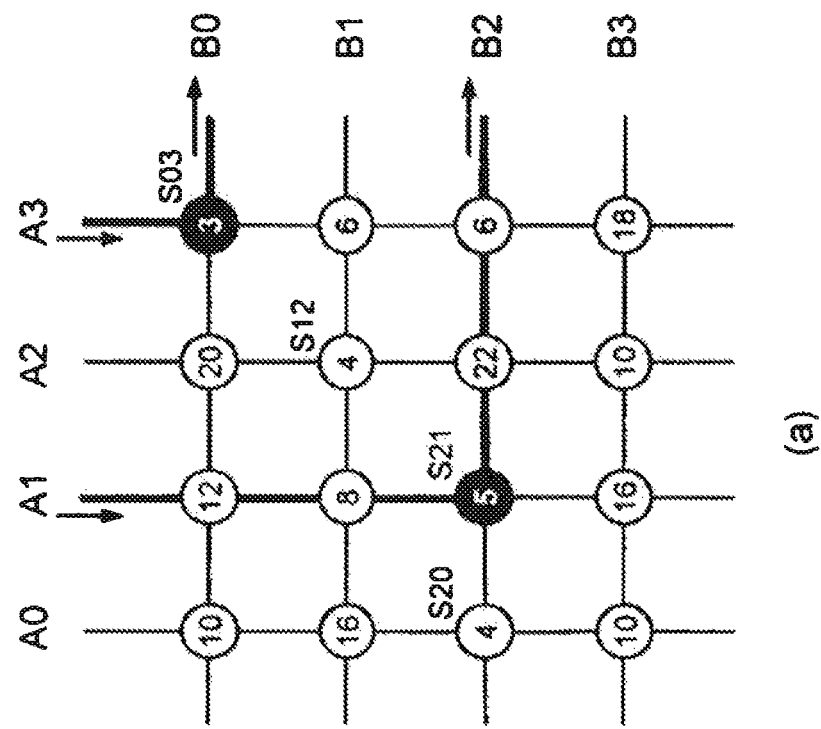
FIG. 31 is a schematic diagram illustrating an example of a determining process of a signal path considering rewrite history information.
Figure 31:
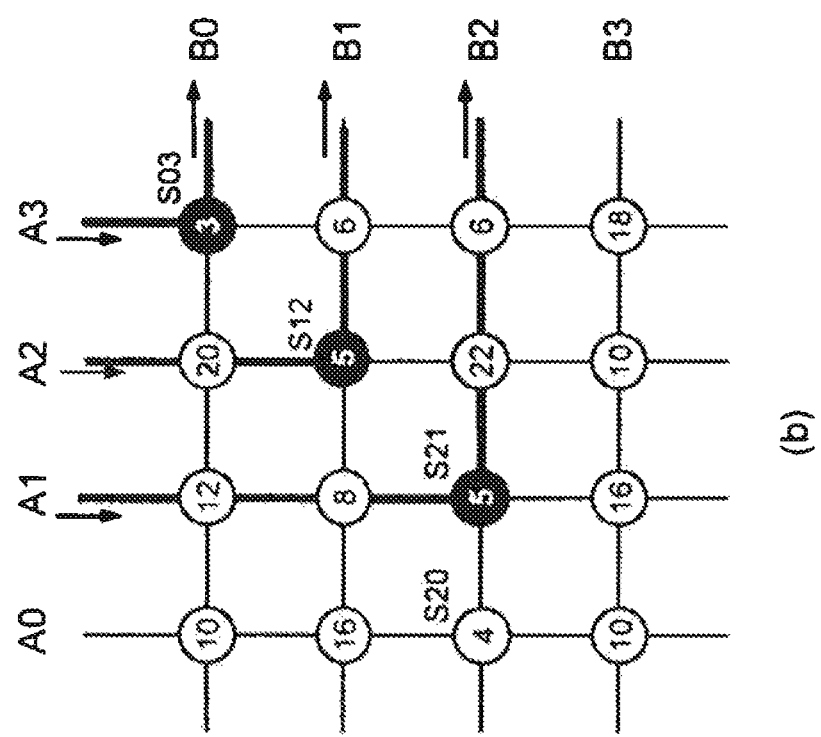

FIG. 31 is a schematic diagram illustrating an example of a process of determining a signal path considering rewrite history information.

In FIG. 31, the numbers written in the switch cells indicate the number of rewrites executed in the past. FIG. 31(a) illustrates a state of the crossbar switch block which is a part of the configuration information of the circuit A. In the circuit A, two signal paths from the wirings A0 to A3 to the wirings B0 to B3 are formed, and the switches S21 and S03 having a small number of times of rewriting are preferentially utilized. In other words, by turning on the switch S21, a signal path from the wiring A1 to the wiring B2 is formed, and by turning on the switch S03, a signal path from the wiring A3 to the wiring B0 is formed.

Here, in the circuit B, it is assumed that three signal paths are formed from the wirings A0 to A3 to the wirings B0 to B3 in the same crossbar switch block. In this case, the most effective way to suppress the number of times of rewriting of each switch is to not turn on/off each switch as much as possible. In other words, among the three signal paths, the signal path from the wiring A1 to the wiring B2 via the switch S21 and the signal path from the wiring A3 via the switch S03 to the wiring B0 are not changed. Switch candidates used to form the remaining one signal path are switches S20 and S12 with few rewrite times (4 in the example of FIG. 31(a)). However, the switch S20 cannot be selected because the wiring B2 to which the switch S20 is connected has already been used. On the other hand, the switch S12 is an available switch resource.

Therefore, configuration information for forming a signal path from the wiring A2 to the wiring B1 is created by turning on the switch S12. The result is illustrated in FIG. 31(b).

As described above, the rewrite history information is created by taking the difference between the configuration information (circuit A) to be rewritten and the configuration information (circuit B) read from the programmable logic integrated circuit 1 by the rewrite history analysis tool 106. When configuration of circuit B fails and configuration is to be executed again, the rewrite history information is created by taking the difference between the configuration information (circuit B) previously read from the programmable logic integrated circuit 1 and the configuration information (circuit B') read from the programmable logic integrated circuit 1 after the reconfiguration.

The design support system of the present invention is not limited to the above-described fifth example embodiment, and may be changed as appropriate within the scope of the technical idea of the present invention.

For example, when the programmable logic integrated circuit 1 has an interface capable of sending and receiving data conforming to the communication standard supported by the computer system (the design support system 10), the programmable logic integrated circuit 1 may be directly connected to the design support system 10 without going through the configuration information transfer device 16.

In addition, for example, the place and route tool 102 may have a function of creating resource information, a function of creating defect information, a function of creating rewrite history information, or the like.

Note that, the defect analysis tool 105 utilizing configuration information read from the programmable logic integrated circuit 1, the rewrite history analysis tool 106, the resource setting tool 104, and the placement and routing tool 102 preferably have a function to urge a designer to connect the programmable logic integrated circuit 1 to a design support system, for example.

In addition, since resource information such as defect information and rewrite history information is information unique to the device (programmable logic integrated circuit 1), it is desirable that the programmable logic integrated circuit 1 comprises storage means for storing an identification number (ID) for identifying the programmable logic integrated circuit 1. In that case, the defect analysis tool 105 utilizing configuration information read from the programmable logic integrated circuit 1, the rewrite history analysis tool 106, the resource setting tool 104 and the placement and routing tool 102 are preferably provided with a function for reading the identification number (ID) from the programmable logic integrated circuit 1. Further, it is desirable that the design support system 10 has a function of recording the identification number (ID) read out from the programmable logic integrated circuit 1 and the date and time of reading thereof in resource information or the like.

(Supplementary Note 1)
A programmable logic integrated circuit, comprising:
a plurality of logic blocks;
a plurality of crossbar switch blocks having a plurality of variable resistance elements arranged at intersections of a plurality of first wirings extending in a first direction and a plurality of second wirings extending in a second direction, for connecting or disconnecting between the first wiring and the second wirings;
a connection switch block for connecting or disconnecting between an input wiring for inputting a signal to the logic block and the crossbar switch block;
reading means for detecting a state of the variable resistance element;
writing means for changing a state of the variable resistance element; and
control means for reading a state of each variable resistance element by the reading means and changing only a state of the variable resistance element different from a state indicated by the configuration information by the writing means when changing a state of the variable resistance element according to the configuration information inputted from the outside.

(Supplementary Note 2)
The programmable logic integrated circuit according to Supplementary note 1, wherein
the connection switch block comprises
a switch element for connecting or disconnecting between the input wiring and the second wiring, and
the control means disconnects
between a second wiring to which a variable resistance element in which a failure has occurred is connected by the switch element and the input wiring, when a failure occurs in which a state cannot be changed in the variable resistance element.

(Supplementary Note 3)
The programmable logic integrated circuit according to Supplementary note 1, wherein
the connection switch block comprises:
a first connection switch block connecting between the input wiring and the second wiring; and
a second connection switch block including a switch element for connecting or disconnecting between the logic block and an output wiring for outputting an output signal of the logic block, and the first wiring,
the crossbar switch block further comprises
a first redundant wiring extending in the first direction, and
the control means connects
between the output wiring to a first wiring adjacent to the first wiring or the first redundant wiring instead of a first wiring to which the variable resistance element having the defect is connected by the switch element when a failure occurs in which a state cannot be changed in the variable resistance element.

(Supplementary Note 4)
The programmable logic integrated circuit according to Supplementary note 1, wherein the connection switch block comprises:
a second redundant wiring extending in the second direction; and
a switch element connecting or disconnecting between the input wiring and the second redundant wiring, and the second wiring, and
the control means connects
between the input wiring to the second wiring adjacent to the second wiring or the second redundant wiring instead of the second wiring to which a variable resistance element in which a failure has occurred is connected by the switch element when a failure has occurred in which the state cannot be changed in the variable resistance element.

(Supplementary Note 5)
The programmable logic integrated circuit according to Supplementary note 1, wherein the connection switch block comprises:

a first connection switch block including a first switch element for connecting or disconnecting between the input wiring and the second wiring; and a second connection switch block including a second switch element for connecting or disconnecting between the logic block and an output wiring for outputting output a signal of the logic block, and the first wiring, the crossbar switch block further comprises a first redundant wiring extending in the first direction, the first connection switch block further comprises a second redundant wiring extending in the second direction, the control means connects between the input wiring to the second wiring adjacent to the second wiring or the second redundant wiring instead of the second wiring to which a variable resistance element in which a failure has occurred is connected by the first switch element when a failure occurs in which the state cannot be changed in the variable resistance element, and the output wiring is connected to a first wiring adjacent to the first wiring or the first redundant wiring instead of a first wiring to which the variable resistance element having the defect is connected by the second switch element.

(Supplementary Note 6)

The programmable logic integrated circuit according to Supplementary note 2 or 4, wherein the connection switch block comprises a memory element which is provided for each of the second wirings and holds information indicating the presence or absence of the variable resistance element in which a failure has occurred, and the memory element includes a variable resistance element.

(Supplementary Note 7)

The programmable logic integrated circuit according to Supplementary note 3 or 5, wherein the first connection switch block comprises a first memory element provided for each of the second wirings and holding information indicating the presence or absence of the variable resistance element in which a failure has occurred, the second connection switch block comprises a second memory element provided correspondingly for each of the first wirings and holding information indicating the presence or absence of the variable resistance element in which a failure has occurred, and the first memory element and the second memory element include a variable resistance element.

(Supplementary Note 8)

The programmable logic integrated circuit according to any one of Supplementary notes 1 to 7, wherein the variable resistance element is a solid electrolyte resistance element, a metal oxide resistance element, a phase change resistance element, or a magneto-resistive element.

(Supplementary Note 9)

A design support system for supporting a design of a circuit to be implemented on a programmable logic integrated circuit including a variable resistance element, comprising:

resource setting means for generating resource information which is information indicating a circuit element usable in the circuit based on defect information indicating the presence or absence of a failure of the programmable logic integrated circuit to which the circuit is to be implemented;

configuration information generating means for generating configuration information by performing virtual placement and routing based on a netlist which is connection information of element circuits included in the programmable logic integrated circuit and the resource information; and defect information generating means for comparing configuration information generated by the configuration information generating means with internal configuration information which is configuration information read from the programmable logic integrated circuit and updating the defect information when the configuration information generated by the configuration information generating means and the internal configuration information do not match each other.

(Supplementary Note 10)

The design support system according to Supplementary note 9, wherein the resource setting means determines whether the defective element which is a variable resistance element in which a failure has occurred is fixed in the ON state or fixed in the OFF state when a failure in which the state cannot be changed in the variable resistance element occurs, and updates the resource information by deleting the defective element fixed in the OFF state from the resource information, and the configuration information generating means generates the configuration information based on the updated resource information by the resource setting means.

(Supplementary Note 11)

The design support system according to Supplementary note 9 or 10, wherein the resource setting means determines whether or not a wiring to which a defective element which is the variable resistance element in which a failure has occurred is connected or a circuit element including the defective element is replaceable by a redundant wiring or a redundant circuit included in the programmable logic integrated circuit when a failure in which the state cannot be changed in the variable resistance element occurs, and deletes the wiring including a defective element or the circuit element including a defective element from the resource information, and updates the resource information by adding the redundant wiring or the redundant circuit to the resource information, the configuration information generating means generates the configuration information based on resource information updated by the resource setting means.

(Supplementary Note 12)

The design support system according to any one of Supplementary notes 9 to 11, further comprising rewrite history information generating means for generating rewrite history information indicating the number of times of changing the state of the variable resistance element, wherein the configuration information generating means preferentially uses a variable resistance element having a small number of state change times based on the netlist, the resource information, and the rewrite history information, and generates the configuration information.

(Supplementary Note 13)

The design support system according to any one of Supplementary notes 10 to 12, wherein the programmable logic integrated circuit includes a connection switch block that is provided for each wiring to which the variable resistance element is connected and includes a memory element that holds information indicating the presence or absence of the variable resistance element in which a failure has occurred and connects or disconnects an I/O wiring of a logic block and a wiring to which the variable resistance element is connected, and the resource setting means generates configuration information for setting in the memory element in such a manner to disconnect a wiring to which the defective element which is a variable resistance element in which a failure has occurred is connected from the I/O wiring when a failure in which the state cannot be changed in the variable resistance element occurs.

(Supplementary Note 14)

The design support system according to Supplementary note 11, wherein the programmable logic integrated circuit includes a connection switch block that is provided for each wiring to which the variable resistance element is connected and includes a memory element that holds information indicating the presence or absence of the variable resistance element in which a failure has occurred and connects or disconnects an I/O wiring of a logic block and a wiring to which the variable resistance element is connected, and the resource setting means generates configuration information for setting in the memory element in such a manner to connect the redundant wiring to the I/O wiring instead of a wiring to which the defective element which is a variable resistance element in which a failure has occurred is connected when a failure in which the state cannot be changed in the variable resistance element occurs.

(Supplementary Note 15)

A configuration method for forming a desired circuit in a programmable logic integrated circuit including a variable resistance element, comprising:

a first step of logically combining operation description information of the circuit described by a hardware description language and generating a netlist of the circuit;

a second step of generating resource information which is information indicating a circuit element usable in the circuit based on the netlist and defect information indicating the presence or absence of a failure in the programmable logic integrated circuit to be implemented on the circuit;

a third step of implementing virtual placement and routing based on the netlist and the resource information to generate configuration information which is information needed for forming the circuit;

a fourth step of calculating a signal delay and power consumption of the circuit indicated by the configuration information created in the third step and verifying whether or not a preset specification is satisfied;

a fifth step of writing the configuration information verified in the fourth step into the programmable logic integrated circuit;

a sixth step of acquiring internal configuration information which is configuration information written in the programmable logic integrated circuit;

a seventh step of comparing the configuration information verified in the fourth step with the internal configuration information;

an eighth step of updating the defect information based on a difference between the configuration information verified in the fourth step and the internal configuration information when the configuration information verified in the fourth step does not match the internal configuration information; and a ninth step of repeating the second to eighth steps until the configuration information verified in the fourth step and the internal configuration information match.

(Supplementary Note 16)

The configuration method according to Supplementary note 15, further comprising a tenth step of comparing the configuration information verified in the fourth step with the internal configuration information and generating rewrite history information indicating the number of changes in the state of the variable resistance element, wherein in the third step, virtual placement and routing is performed based on the netlist, the resource information and the rewrite history information, and configuration information which is information needed for forming the circuit is generated.

(Supplementary Note 17)

A recording medium recording a design support program for supporting design of a circuit to be implemented on a programmable logic integrated circuit including a variable resistance element, causing a computer to function as:

resource setting means for generating resource information which is information indicating a circuit element usable in the circuit based on defect information indicating the presence or absence of a failure of the programmable logic integrated circuit to which the circuit is to be implemented;

configuration information generating means for generating configuration information by performing virtual placement and routing based on a netlist which is connection information of element circuits included in the programmable logic integrated circuit and the resource information; and defect information generating means for comparing configuration information generated by the configuration information generating means with internal configuration information which is configuration information read from the programmable logic integrated circuit and updating the defect information when the configuration information generated by the configuration information generating means and the internal configuration information do not match each other.

(Supplementary Note 18)

A recording medium recording a design support program according to Supplementary note 17, causing the computer to function in such a manner that:

the resource setting means determines whether the defective element which is a variable resistance element in which a failure has occurred is fixed in the ON state or fixed in the OFF state when a failure in which the state cannot be changed in the variable resistance element occurs, and updates the resource information by deleting the defective element fixed in the OFF state from the resource information, and the configuration information generating means generates the configuration information based on the updated resource information by the resource setting means.

The present invention has been described above by exemplifying the above-described example embodiment as a typical example. However, the present invention is not limited to the above-described example embodiment. In other words, in the present invention, various aspects that can be understood by those skilled in the art can be applied within the scope of the present invention.

This application is based upon and claims the benefit of priority from Japanese Patent Application No. 2015-109908, filed on May 29, 2015, the disclosure of which is incorporated herein in its entirety by reference.

REFERENCE SIGNS LIST

1 Programmable logic integrated circuit
2 Programmable logic cell array
3 Write driver
4 Sense amplifier
5 Write buffer
6 Read buffer
7 Controller
10 Design support system
11 Arithmetic device
12 Storage device
13 Display device
14 I/O device
15 Bus
16 Configuration information transfer device
21 Logic block
22 Switch block
100 Design support tool group
101 Logic synthesis tool
102 Place and route tool
103 Delay power analysis tool
104 Resource configuration tool
105 Defect analysis tool
106 Rewrite history analysis tool
221 First crossbar switch block
222 Second crossbar switch block
223 Connection switch block
224 Switch cell
225 Output buffer
226 First connection switch block
227 Second connection switch block

What is claimed is:

1. A programmable logic integrated circuit, comprising:
a plurality of logic blocks;
a plurality of crossbar switch blocks having a plurality of variable resistance elements arranged at intersections of a plurality of first wirings extending in a first direction and a plurality of second wirings extending in a second direction, for connecting or disconnecting between the first wirings and the second wirings;
a connection switch block for connecting or disconnecting between an input wiring for inputting a signal to the logic block and the crossbar switch block;
a reading unit that detects a state of the variable resistance element;
a writing unit that changes a state of the variable resistance element; and
a control unit that reads a state of each variable resistance element by the reading unit and changing only a state of the variable resistance element different from a state indicated by the configuration information by the writing unit when changing a state of the variable resistance element according to the configuration information inputted from the outside.

2. The programmable logic integrated circuit according to claim 1, wherein
the connection switch block comprises
a switch element for connecting or disconnecting between the input wiring and the second wiring, and
the control unit disconnects
between a second wiring to which a variable resistance element in which a failure has occurred is connected by the switch element and the input wiring when a failure occurs in which a state cannot be changed in the variable resistance element.

3. The programmable logic integrated circuit according to claim 2, wherein
the connection switch block comprises
a memory element which is provided for each of the second wirings and holds information indicating the presence or absence of the variable resistance element in which a failure has occurred, and
the memory element includes a variable resistance element.

4. The programmable logic integrated circuit according to claim 1, wherein
the connection switch block comprises:
a first connection switch block connecting the input wiring and the second wiring; and
a second connection switch block including a switch element for connecting or disconnecting between the logic block and an output wiring for outputting an output signal of the logic block, and the first wiring,
the crossbar switch block further comprises
a first redundant wiring extending in the first direction, and
the control unit connects
between the output wiring to a first wiring adjacent to the first wiring or the first redundant wiring instead of a first wiring to which the variable resistance element having the defect is connected by the switch element when a failure occurs in which a state cannot be changed in the variable resistance element.

5. The programmable logic integrated circuit according to claim 4, wherein
the first connection switch block
comprises a first memory element provided for each of the second wirings and holding information indicating the presence or absence of the variable resistance element in which a failure has occurred,
the second connection switch block comprises a second memory element provided correspondingly for each of the first wirings and holding information indicating the presence or absence of the variable resistance element in which a failure has occurred, and
the first memory element and the second memory element include a variable resistance element.

6. The programmable logic integrated circuit according to claim 1, wherein the connection switch block comprises:
a second redundant wiring extending in the second direction; and
a switch element connecting or disconnecting between the input wiring and the second redundant wiring, and the second wiring, and
the control unit connects
between the input wiring to the second wiring adjacent to the second wiring or the second redundant wiring instead of the second wiring to which a variable resistance element in which a failure has occurred is connected by the switch element when a failure has occurred in which the state cannot be changed in the variable resistance element.

7. The programmable logic integrated circuit according to claim 1, wherein the connection switch block comprises:
a first connection switch block including a first switch element for connecting or disconnecting between the input wiring and the second wiring; and
a second connection switch block including a second switch element for connecting or disconnecting between the logic block and an output wiring for outputting output a signal of the logic block, and the first wiring, the crossbar switch block further comprises a first redundant wiring extending in the first direction, the first connection switch block further comprises a second redundant wiring extending in the second direction, the control unit connects between the input wiring to the second wiring adjacent to the second wiring or the second redundant wiring instead of the second wiring to which a variable resistance element in which a failure has occurred is connected by the first switch element when a failure occurs in which the state cannot be changed in the variable resistance element, and the output wiring is connected to a first wiring adjacent to the first wiring or the first redundant wiring instead of a first wiring to which the variable resistance element having the defect is connected by the second switch element.

8. The programmable logic integrated circuit according to claim 1, wherein the variable resistance element is a solid electrolyte resistance element, a metal oxide resistance element, a phase change resistance element, or a magneto-resistive element.

\* \* \* \* \*